(12) United States Patent
Bhatia et al.

(10) Patent No.: US 12,135,607 B2
(45) Date of Patent: Nov. 5, 2024

(54) HARDWARE-EFFICIENT PAM-3 ENCODER AND DECODER

(71) Applicant: NVIDIA Corp., Santa Clara, CA (US)

(72) Inventors: Gautam Bhatia, San Mateo, CA (US); Sunil Sudhakaran, Brisbane, CA (US); Kyutaeg Oh, San Ramon, CA (US)

(73) Assignee: NVIDIA Corp., Santa Clara, CA (US)

( * ) Notice: Subject to any disclaimer, the term of this patent is extended or adjusted under 35 U.S.C. 154(b) by 102 days.

(21) Appl. No.: 18/186,464

(22) Filed: Mar. 20, 2023

(65) Prior Publication Data

US 2023/0297466 A1   Sep. 21, 2023

Related U.S. Application Data

(63) Continuation-in-part of application No. 17/931,062, filed on Sep. 9, 2022.

(60) Provisional application No. 63/330,315, filed on Apr. 13, 2022, provisional application No. 63/329,838, filed on Apr. 11, 2022, provisional application No. 63/328,172, filed on Apr. 6, 2022, provisional application No. 63/321,534, filed on Mar. 18, 2022.

(51) Int. Cl.
*G06F 11/10* (2006.01)
*G06F 11/07* (2006.01)

(52) U.S. Cl.
CPC ...... *G06F 11/1004* (2013.01); *G06F 11/0787* (2013.01); *G06F 11/1068* (2013.01)

(58) Field of Classification Search
CPC ............. G06F 11/1068; G06F 11/1004; G06F 11/0787

USPC ........................................................ 714/764
See application file for complete search history.

(56) References Cited

U.S. PATENT DOCUMENTS

| | | | |
|---|---|---|---|
| 4,623,223 A | 11/1986 | Kempf | |
| 4,667,337 A | 5/1987 | Fletcher | |
| 4,739,323 A | 4/1988 | Miesterfeld et al. | |
| 4,742,349 A | 5/1988 | Miesterfeld et al. | |
| 5,377,020 A | 12/1994 | Smitt | |
| 5,487,665 A | 1/1996 | Lechner et al. | |
| 5,572,736 A | 11/1996 | Curran | |
| 5,833,340 A | 11/1998 | Yoshikawa et al. | |
| 5,856,980 A | 1/1999 | Doyle | |
| 5,890,005 A | 3/1999 | Lindholm | |
| 6,046,943 A | 4/2000 | Walker | |

(Continued)

FOREIGN PATENT DOCUMENTS

| | | |
|---|---|---|
| DE | 102019108205 A1 | 10/2019 |
| DE | 102019118340 A1 | 1/2020 |

(Continued)

OTHER PUBLICATIONS

U.S. Appl. No. 16/557,637, filed Aug. 30, 2019, Sunil Sudhakaran.

(Continued)

*Primary Examiner* — Leila Malek
(74) *Attorney, Agent, or Firm* — Rowan TELS LLC

(57) ABSTRACT

Data bits are encoded in one or both of an eleven bit seven pulse amplitude modulated three-level (PAM-3) symbol (11b7s) format and a three bit two symbol (3b2s) format on a plurality of data channels and on an error correction channel. One or more of a cyclic redundancy check (CRC) value, a poison value, and a severity value are encoded as 11b7s and/or 3b2s PAM-3 symbols on the error correction channel.

27 Claims, 23 Drawing Sheets

(56) References Cited

U.S. PATENT DOCUMENTS

| | | |
|---|---|---|
| 6,285,300 B1 | 9/2001 | Colon-Bonet |
| 6,335,718 B1 | 1/2002 | Hong et al. |
| 6,348,915 B1 | 2/2002 | Yamashita et al. |
| 6,400,633 B1 | 6/2002 | Al-Shamma et al. |
| 6,442,077 B2 | 8/2002 | Shin |
| 6,489,900 B2 | 12/2002 | Shin et al. |
| 6,604,120 B1 | 8/2003 | De Angel |
| 6,717,990 B1 | 4/2004 | Abousleman |
| 6,877,050 B2 | 4/2005 | Kanzaki et al. |
| 7,022,736 B2 | 4/2006 | Neuner et al. |
| 7,061,408 B2 | 6/2006 | Poechmueller |
| 7,082,489 B2 | 7/2006 | Yeh et al. |
| 7,135,996 B1 | 11/2006 | Lo et al. |
| 7,149,955 B1 | 12/2006 | Sutardja et al. |
| 7,188,263 B1 | 3/2007 | Rubinstein et al. |
| 7,356,632 B2 | 4/2008 | Yeh et al. |
| RE40,864 E | 7/2009 | Hong et al. |
| 7,620,116 B2 | 11/2009 | Bessios et al. |
| 7,782,682 B2 | 8/2010 | Matsuzaki et al. |
| 8,022,726 B2 | 9/2011 | Candage et al. |
| 8,022,736 B2 | 9/2011 | Chang et al. |
| 8,181,101 B2 | 5/2012 | Shen et al. |
| 8,189,263 B1 | 5/2012 | Wang et al. |
| 8,359,498 B1 | 1/2013 | Sutardja et al. |
| 8,984,380 B2 | 3/2015 | Vijayaraghavan et al. |
| 9,184,906 B1 | 11/2015 | Min et al. |
| 9,231,704 B1 | 1/2016 | Zhou et al. |
| 9,240,907 B2 | 1/2016 | Wang |
| 9,244,763 B1 | 1/2016 | Kankani et al. |
| 9,548,858 B1 | 1/2017 | Cirit et al. |
| 9,564,990 B1 | 2/2017 | Tiruvur et al. |
| 9,853,769 B1 | 12/2017 | Farjad et al. |
| 9,942,063 B2 | 4/2018 | Mendel |
| 9,978,171 B2 | 5/2018 | Bolz et al. |
| 10,312,896 B2 | 6/2019 | Kim et al. |
| 10,424,074 B1 | 9/2019 | Uralsky et al. |
| 10,491,435 B2 | 11/2019 | Lee et al. |
| 10,581,645 B1 | 3/2020 | Song et al. |
| 10,599,606 B2 | 3/2020 | Lee et al. |
| 10,657,094 B2 | 5/2020 | Lee et al. |
| 10,657,306 B1 | 5/2020 | Ma et al. |
| 10,699,427 B2 | 6/2020 | Uralsky et al. |
| 10,979,176 B1 | 4/2021 | Sudhakaran et al. |
| 2003/0035497 A1 | 2/2003 | Gorecki et al. |
| 2003/0076718 A1 | 4/2003 | Rolandi |
| 2003/0108134 A1 | 6/2003 | Stonick et al. |
| 2004/0114692 A1 | 6/2004 | Matsumoto |
| 2004/0153318 A1 | 8/2004 | Chamberlain |
| 2005/0086417 A1 | 4/2005 | Meyer et al. |
| 2005/0089126 A1 | 4/2005 | Zerbe et al. |
| 2005/0099325 A1 | 5/2005 | Bessios |
| 2005/0185281 A1 | 8/2005 | Perlin et al. |
| 2006/0109917 A1 | 5/2006 | Fonseka et al. |
| 2006/0139186 A1 | 6/2006 | Hoyer |
| 2006/0280272 A1 | 12/2006 | Stojanovic |
| 2007/0203962 A1 | 8/2007 | Hirairi |
| 2008/0181331 A1 | 7/2008 | Casper et al. |
| 2008/0262855 A1 | 10/2008 | Mehrotra et al. |
| 2009/0193319 A1 | 7/2009 | Shen et al. |
| 2009/0323722 A1 | 12/2009 | Sharma |
| 2010/0174844 A1 | 7/2010 | Chu |
| 2010/0214138 A1 | 8/2010 | Hollis |
| 2010/0299440 A1 | 11/2010 | Meyer et al. |
| 2011/0264719 A1 | 10/2011 | Mortensen |
| 2012/0110255 A1 | 5/2012 | Meyer et al. |
| 2012/0144161 A1 | 6/2012 | Elliott |
| 2012/0204082 A1 | 8/2012 | Shen et al. |
| 2012/0206280 A1 | 8/2012 | Abbasfar et al. |
| 2012/0250746 A1 | 10/2012 | Sonntag |
| 2013/0226982 A1 | 8/2013 | Yu |
| 2014/0153620 A1 | 6/2014 | Longo et al. |
| 2014/0173296 A1 | 6/2014 | Muff et al. |
| 2014/0281075 A1 | 9/2014 | Hollis |
| 2014/0298458 A1 | 10/2014 | Lewis et al. |
| 2014/0358979 A1 | 12/2014 | Singh |
| 2015/0137789 A1 | 5/2015 | Furtner |
| 2015/0235634 A1 | 8/2015 | Liu et al. |
| 2016/0013958 A1 | 1/2016 | Mishra et al. |
| 2016/0164705 A1 | 6/2016 | Whitby-Strevens |
| 2016/0173134 A1 | 6/2016 | Kwon et al. |
| 2016/0373557 A1 | 12/2016 | Sikkink et al. |
| 2017/0075854 A1 | 3/2017 | Hollis |
| 2017/0207908 A1 | 7/2017 | Cirit et al. |
| 2017/0220518 A1 | 8/2017 | Sengoku et al. |
| 2017/0272285 A1 | 9/2017 | Shokrollahi et al. |
| 2017/0310529 A1 | 10/2017 | Yang et al. |
| 2017/0373887 A1 | 12/2017 | Ho |
| 2018/0091189 A1 | 3/2018 | Chada et al. |
| 2018/0091335 A1 | 3/2018 | Schnizler |
| 2018/0123839 A1 | 5/2018 | Chung et al. |
| 2019/0199560 A1 | 6/2019 | Bossard et al. |
| 2019/0303340 A1 | 10/2019 | Lee et al. |
| 2019/0305765 A1 | 10/2019 | Lee et al. |
| 2019/0305995 A1 | 10/2019 | Lee et al. |
| 2020/0050923 A1 | 2/2020 | Patney et al. |
| 2020/0151289 A1 | 5/2020 | Sikka et al. |
| 2020/0159437 A1* | 5/2020 | Walker ................ G06F 3/0647 |
| 2020/0175392 A1 | 6/2020 | Tang et al. |
| 2020/0210276 A1 | 7/2020 | Sullivan et al. |
| 2020/0210805 A1 | 7/2020 | Drozdowski et al. |
| 2021/0012825 A1* | 1/2021 | Martinelli ............ G11C 29/806 |
| 2021/0105023 A1* | 4/2021 | Cornelius ............... H03M 7/46 |

FOREIGN PATENT DOCUMENTS

| | | |
|---|---|---|
| DE | 102019123711 A1 | 3/2020 |
| EP | 3167579 B1 | 6/2018 |
| KR | 20010065770 A | 7/2001 |
| KR | 100321164 B1 | 3/2002 |
| WO | 2015077606 A1 | 5/2015 |

OTHER PUBLICATIONS 10 2019 107 849.0_DPMA_Office Action Dated Aug. 11, 2021.
10 2019 108 205.6 DPMA Office Action Dated Aug. 10, 2021.
Acquaviva, Andrea, et al., A Spatially-Adaptive BusInterface for Low-Switching Communication, ISLPED '00, pp. 238-240, Rapallo, Italy., Feb. 2020.
AN 835 PAM4 Signaling Fundamentals by INTEL 03122019.
Arnold, J.S., et al., Design of tightly-coupled multiprocessing programming, IBM Systems Journal, vol. 13 , Issue: 1, pp. 60-87, 1974.
Baek, Kwang-Hyun, et al., A Low Energy Encoding Technique for Reduction of Coupling Effects in SoC Interconnects, Proc. 43rd IEEE Midwest Symp. on Circuits and Systems, pp. 80-83, Lansing MI. Aug. 11, 2000.
Benini, Luca, et al., Address Bus Encoding Techniques for System-Level Power Optimization, Proceedings Design, Automation and Test in Europe, IEEE, Paris, France, Feb. 1998.
Benini, Luca, et al., Asymptotic Zero-Transition Activity Encoding for Address Busses in Low-Power Microprocessor-Based Systems, Proceedings Great Lakes Symposium on VLSI, IEEE, Urbana-Champaign, IL, USA, pp. 77-82, Mar. 1997.
Benini, Luca, et al., Power Optimization of Core-Based Systems by Address Bus Encoding, IEEE Transactions on Very Large Scale Integration (VLSI) Systems, vol. 6, No. 4, Dec. 1998, pp. 554-562.
Benini, Luca, et al., System-Level Power Optimization: Techniques and Tools, ISLPED99, San Diego, CA, USA, 1999, pp. 288-293.
Bishop, Benjamin, et al., A Low-Energy Adaptive Bus Coding Scheme, Proceedings IEEE Computer Society Workshop on VLSI 2001. Emerging Technologies for VLSI Systems, Orlando, FL, USA, Apr. 2001, pp. 118-122.
Campbell, John E., et al., Design Considerations for a VLSI Microprocessor, IBM J. Res. Develop. vol. 26 No. 4,. Jul. 1982, pp. 454-463.
Canegallo, Roberto, et al., Low Power Techniques for FLASH Memories, ISCAS 2001. The 2001 IEEE International Symposium on Circuits and Systems (Cat. No. 01CH37196), May 2001, Sydney, NSW, Australia, IV-494-IV497.

(56) References Cited

OTHER PUBLICATIONS

Catthoor, F., et al., Global Communication and Memory Optimizing Transformations for Low Power Signal Processing Systems, Proceedings of 1994 IEEE Workshop on VLSI Signal Processing, La Jolla, CA, USA, Oct. 1994, pp. 178-187.
Chandrakasan, Anantha P., et al., A Low-Power Chipset for a Portable Multimedia I/O Terminal, IEEE Journal of Solid-State Circuits. vol. 29, No. 12, Dec. 1994, pp. 1415-1428.
Chandrakasan, Anantha P., et al., Low-Power CMOS Digital Design, IEEE Journal of Solid-State Circuits. vol 27, No. 4. Apr. 1992, pp. 473-484.
Chandrakasan, Anantha P., et al., Minimizing Power Consumption in Digital CMOS Circuits, Proceedings of the IEEE, vol. 83, No. 4, Apr. 1995, pp. 498-523.
Chandrakasan, Anantha P., et al., Optimizing Power Using Transformations, IEEE Transactions on Computer-Aided Design of Integrated Circuits and Systems, vol. 14, No. 1, Jan. 1995, pp. 12-31.
Chang, Naehyuck, et al., Bus Encoding for Low-Power High-Performance Memory Systems, DAC '00: Proceedings of the 37th Annual Design Automation Conference, Jun. 2000, pp. 800-805.
Chang, Naehyuck, et al., Dual-Mode Low-Power Bus Encoding for High-Performance Bus Drivers, Conference: TENCON 99. Proceedings of the IEEE Region 10 Conference, vol. 2, Jan. 2000, pp. 876-879.
Chang, You-Sung, et al., Conforming Inverted Data Store for Low Power Memory, Proceedings. 1999 International Symposium on Low Power Electronics and Design (Cat. No. 99TH8477), Aug. 1999, San Diego, CA, USA.
Chao, H.H., et al., Designing the Micro370, IEEE Design & Test, Jun. 1987, pp. 32-40.
Chatterjee, Pallab, ULSI CMOS—The Next Ten years, Microelectronic Engineering 19 (1992), pp. 3-8.
Cheng, Wei-Chung, et al., Memory Bus Encoding for Low Power: A Tutorial, Proceedings of the IEEE 2001. 2nd International Symposium on Quality Electronic Design, Mar. 2001, San Jose, CA, USA, pp. 199-204.
Cheng, Wei-Chung, et al., Power-Optimal Encoding for DRAM Address Bus, ISLPED '00: Proceedings of the 2000 International symposium on Low power electronics and design, Aug. 2000, pp. 250-252.
Chou, Tan-Li, et al., Estimation of Circuit Activity Considering Signal Correlations and Simultaneous Switching, IEEE ACM International Conference on Computer-Aided Design, Nov. 1994, pp. 300-303.
De Angel, Edwin, et al., Survey of Low Power Techniques for VLSI Design, Innovative Systems in Silicon Conference Session 6: Analog and Low Power Electronics, 1996, pp. 159-169.
Donaldson, Darrel D., et al., SNOS 1K×8 Static Nonvolatile RAM, IEEE Journal of Solid-State Circuits, vol. SC-17, No. 5, Oct. 1982, pp. 847-851.
Elliott, R.C., Managed Load Distribution, INTELEC '81—Third International Telecommunications Energy Conference, pp. 50-55.
Elpida, 128M bits Self Terminated Interface DDR SDRAM, Preliminary Datasheet Ver. 1.0, Jul. 2002.
Ewen, J. F., et al., CMOS circuits for GB/s serial data communication, IBM J. Res. Develop. vol. 39 No. 1/2 Jan./Mar. 1995, pp. 73-81.
Fagan, John L., et al., A 16-kbit Nonvolatile Charge Addressed Memory, IEEE Journal of Solid-State Circuits, vol. SC-11, No. 5, Oct. 1976, pp. 631-636.
Fornaciari, William, et al., Influence of Caching and Encoding on Power Dissipation of System-Level Buses for Embedded Systems, Design, Automation and Test in Europe Conference and Exhibition, 1999. Proceedings (Cat. No. PR00078), Mar. 1999, Munich, Germany.
GDDR4 Read and Write DBI, GDDR4 SGRAM Data Inversion.
Givargis, Tony D., et al., Interface and Cache Power Exploration for Core-Based Embedded System Design, 1999 IEEE/ACM International Conference on Computer-Aided Design. Digest of Technical Papers (Cat. No. 99CH37051), Nov. 1999, pp. 270-273.

Green, J.H., et al., Line-Protection Switching, The Bell System Technical Journal, vol. 53, No. 10, Dec. 1974, USA, pp. 2011-2034.
Hakenes, Rolf, et al., A Segmented Gray Code for Low-Power Microcontroller Address Buses, Proceedings 25th EUROMICRO Conference. Informatics: Theory and Practice for the New Millennium, Sep. 1999, Milan, Italy.
Harboe-Sørensen, R., et al., Radiation Pre-screening of 4 Mbit Dynamic Random Access Memories for Space Application, RADECS 91 First European Conference on Radiation and its Effects on Devices and Systems, Sep. 1991, La Grande-Motte, France, pp. 489-504.
Harris, Erik P., et al., Technology Directions for Portable Computers, Proceedings of the IEEE, vol. 83, No. 4, Apr. 1995, pp. 636-658.
Hirsch, Donald J., Computer Communications Interface Devices for Tactical C3, MILCOM 1986—IEEE Military Communications Conference: Communications-Computers: Teamed for the 90's, Oct. 1986, pp. 5.4.1-5.4.5.
Hong, Sungpack, et al., Bus-Invert Coding for Low-Power IO—A Decomposition Approach, hoc. 43rd IEEE Midwest Symp. on Circuits and Systems, Lansing MI, Aug. 8-11, 2000, pp. 750-753.
Hossain et al., Channel-Adaptive ADC and TDC for 28 GB/s PAM-4 Digital Receiver.
Hossain, Rozak, et al., Low Power via Reduced Switching Activity and its Application to PLAs, pp. 100-103.
Hoyme, Kenneth, et al., SAFEbus, Proceedings IEEE/AIAA 11th Digital Avionics Systems Conference, Oct. 1992, Seattle, WA, USA, pp. 68-73.
Hsieh, Cheng-Ta, et al., Architectural Power Optimization by Bus Splitting, Proceedings Design, Automation and Test in Europe Conference and Exhibition 2000 (Cat. No. PR00537), Mar. 2000, Paris, France.
Iizuka, Tetsuya, Substrate-fed CMOS Memory Device, 1978 International Electron Devices Meeting, Dec. 1978, Washington, DC, USA, pp. 222-226.
Im et al, A 40-to-56 GB/s PAM-4 Receiver With Ten-Tap Direct Decision-Feedback Equalization in 16-nm FinFET.
Irwin, Mary Jane, et al., Energy Issues in Multimedia Systems, 1999 IEEE Workshop on Signal Processing Systems. SiPS 99. Design and Implementation (Cat. No. 99TH8461), Oct. 1999, Taipei, Taiwan, pp. 24-33.
Khandelwal et al. DesignCon 2016 Year 2016.
Kim, Kyeounsoo, et al., An Efficient Frame Memory Intci-face of MPEG-2 Vidco Encoder ASIC Chip, IEEE Transactions on Consumer Electronics, vol. 45, No. 3, Aug. 1999, pp. 507-514.
Yang, Jun, et al., FV Encoding for Low-Power Data I/O, ISLPED'01: Proceedings of the 2001 International Symposium on Low Power Electronics and Design (IEEE Cat. No. 01TH8581), Aug. 2001, Huntington Beach, CA, USA, pp. 84-87.
Zhang et al, PAM4 Signalling for 56G Serial Link Applications—A Tutorial (Year: 2016).
Kim, Sunghwan, et al., Low-power data representation, Electronics Letters May 25, 2000 vol. 36, No. 11, pp. 958-959.
Leung, Patrick S.-K., et al., Block-Inversion-Coded QAM Systems, IEEE Transactions on Communications, vol. 36, No. 7, Jul. 1988, pp. 797-805.
Lidgate, D., Electrical interlock design for complex high-power switching networks, Proc. IEE, vol. 126, No. 2, Feb. 1979, pp. 152-158.
Lin, Rung-Bin, et al., Theoretical Analysis of Bus-Invert Coding, Proc. 43rd IEFE Midwest Symp. on Circuits and Systems, Lansing MI, Aug. 8-11, 2000, pp. 742-745.
Low Power Bus Transform Coding for Multi Level Signals 2006 Zaman.
Macchiarulo, Luca, Low-Energy Encoding for Deep-Submicron Address Buses, ISLPED'01, Aug. 6-7, 2001, Huntington Beach, California, USA, pp. 176-181.
Mehta, Huzefa, et al., Some Issues in Gray Code Addressing, Proceedings of the Sixth Great Lakes Symposium on VLSI, Mar. 1996, Ames, IA, USA, pp. 178-181.
Moshnyaga, Vasily G., et al., Energy Saving Techniques for Architecture Design of Portable Embedded Devices, Proceedings. Tenth Annual IEEE International ASIC Conference and Exhibit (Cat. No. 97TH8334), Sep. 1997, Portland, OR, USA, pp. 163-167.

(56) References Cited

OTHER PUBLICATIONS

Mudge, Trevor, Power. A First-Class Architectural Design Constraint, Computer, Apr. 2001, pp. 52-58.
Murgai, Rajeev, et al., Using Complement at ion And Resequencing to Minimize Transitions, Proceedings 1998 Design and Automation Conference. 35th DAC. (Cat. No. 98CH36175), Jun. 1998, San Francisco, CA, USA, pp. 694-697.
Musoll, Enric, et al., Exploiting the locality of memory references to reduce the address bus energy, Proceedings of 1997 International Symposium on Low Power Electronics and Design, Aug. 1997, Monteray, CA, USA, pp. 202-207.
Nakamura, Kazuyuki, et al., A 50 % Noise Reduction Interface Using Low-Weight Coding, 1996 Symposium on VLSI Circuits Digest of Technical Papers, Jun. 1996, Honolulu, HI, USA, pp. 144-145.
Noll, Tobias G., Low-Power Strategies for High-Performance CMOS Circuits, ESSCIRC '94: Twientieth European Solid-State Circuits Conference, Sep. 1994, Ulm, Germany, pp. 72-83.
NPL_33681DE_Office Action.
NPL_Khandelwal_etal_DesignCon.
Orton, James L. et al., An Improved Channel Coding Algorithm for Low-Frequency Spectral Suppression, IEEE Transactions on Communications, vol. 37, No. 10, Oct. 1989, pp. 1088-1091.
P. S. Teja, "Design of Radix-8 Booth Multiplier Using Koggestone Adder for High Speed Arithmetic Applications," Emerging Trends in Electrical, Electronics & Instrumentation Engineering: An international Journal (EEIEJ), vol. 1, No. 1, Feb. 2014 (Year: 2014).
Panda, Preeti R., Reducing Address Bus Transit ions for Low Power Memory Mapping, Proceedings ED&TC European Design and Test Conference, Mar. 1996, Paris, France, pp. 63-67.
Panda, Preeti Ranjan, et al., Low-Power Memory Mapping Through Reducing Address Bus Activity, IEEE Transactions on Very Large Scale Integration (VLSI) Systems, vol. 7, No. 3, Sep. 1999, pp. 309-320.
Park, Arvin, et al., Codes to Reduce Switching Transients Across VLSI I/O Pins, ACM SIGARCH Computer Architecture News, Sep. 1992, pp. 17-21.
Patra, P., et al., Power-efficient Delay-insensitive Codes for Data Transmission, Proceedings of the 28th Annual Hawaii International Conference on System Sciences—1995, pp. 316-323.
Pedram, Massoud, Power Optimization and Management in Embedded Systems, Proceedings of the ASP-DAC 2001. Asia and South Pacific Design Automation Conference 2001 (Cat. No. 01EX455), Feb. 2001, Yokohama, Japan, pp. 239-244.
Pupalaikis et al, Designcon 2017, Inphi, 2017, (Year: 2017).
Raghunathan, Anand, et al., Controller re-specification to minimize switching activity in controller/data path circuits, ISLPED 1996 Monterey CA USA, 1996, pp. 301-304.
Ramprasad, Sumant, et al., Achievable Bounds on Signal Transition Activity, 1997 Proceedings of IEEE International Conference on Computer Aided Design (ICCAD), Nov. 1997, San Jose, CA, USA, pp. 126-129.
Ramprasad, Sumant, et al., Coding for Low-Power Address and Data Busses: A Source-Coding Framework and Applications, Proceedings Eleventh International Conference on VLSI Design, Jan. 1998, Chennai, India, pp. 18-23.
Roy, Kaushik, et al., Design of Low Power Digital Systems, Emerging Technologies: Designing Low Power Digital Systems, May 1996, pp. 137-204.
S. Samavi, "High Radix Multipliers," Jan. 2014, retrieved from https://www.researchgate.net/publication/262836009 (Year: 2014).
Sacha, John R., et al., Number Representations for Reducing Data Bus Power Dissipation, Conference Record of Thirty-Second Asilomar Conference on Signals, Systems and Computers (Cat. No. 98CH36284), Nov. 1998, Pacific Grove, CA, USA, pp. 213-217.
Sasaki, Katsuro, et al., A 23-ns 4-Mb CMOS SRAM with 0.2-μA Standby Current, IEEE Journal.o f Solid~Tatec Ircuits, vol. 25, No. 5, Oct. 1990, pp. 1075-1081.
Sechler, R.F., et al., Design at the system level with VLSI CMOS, IBM J. Res. Develop. vol. 39 .No. 1/2 Jan./Mar. 1995, pp. 5-22.
Shin, Youngsoo, et al., Narrow Bus Encoding for Low Power Systems, Proceedings 2000. Design Automation Conference. (IEEE Cat. No. 00CH37106), Jan. 2000, Yokohama, Japan, pp. 217-220.
Shin, Youngsoo, et al., Partial Bus-Invert Coding for Power Optimization of Application-Specific Systems, IEEE Transactions on Very Large Scale Integration (VLSI) Systems, vol. 9, No. 2, Apr. 2001, pp. 377-383.
Shin, Youngsoo, et al., Partial Bus-Invert Coding for Power Optimization of System Level Bus, Proceedings. 1998 International Symposium on Low Power Electronics and Design (IEEE Cat. No. 98TH8379), Aug. 1998, Monterey CA, USA, pp. 127-129.
Shin, Youngsoo, et al., Reduction of bus transitions with partial bus-invert coding, Electronics Letters Apr. 2, 1998 vol. 34, No. 7, pp. 642-643.
Siegmund, Robert, et al., Adaptive Partial Businvert Encoding for Power Efficient Data Transfer over Wide System Buses, Proceedings 13th Symposium on Integrated Circuits and Systems Design (Cat. No. PR00843), Sep. 2000, Manaus, Brazil, pp. 371-376.
Sotiriadis, Paul P., et al., Bus Energy Minimization by Transition Pattern Coding (TPC) in Deep Sub-Micron Technologies, IEEE/ACM International Conference on Computer Aided Design. ICCAD—2000. IEEE/ACM Digest of Technical Papers (Cat. No. 00CH37140), Nov. 2000, San Jose, CA, USA, pp. 322-327.
Sotiriadis, Paul P., et al., Transition Pattern Coding: An approach to reduce Energy in Interconnect, Proceedings of the 26th European Solid-State Circuits Conference, Sep. 2000, Stockholm, Sweden.
Space Coding Applied to High Speed Chip Farzan 2004.
Stan, Mircea R., et al., Bus-Invert Coding for Low-Power I/O, IEEE Transactions on Very Large Scale Integration (VLSI) Systems, vol. 3, No. I , Mar. 1995, pp. 49-58.
Stan, Mircea R., et al., Two-Dimensional Codes for Low Power, ISLPED 1996 Monterey CA USA, pp. 335-340.
Stan, Mircea R., Low-Power Encodings for Global Communication in CMOS VLSI, IEEE Transactions on Very Large Scale Integration (VLSI) Systems, vol. 5, No. 4, Dec. 1997, pp. 444-455.
Su, Ching-Long, et al., Cache Designs for Energy Efficiency, Proceedings of the 28th Annual Hawaii International Conference on System Sciences—1995, pp. 306-315.
Su, Ching-Long, et al., Saving Power in the Control Path of Embedded Processors, IEEE Design & Test of Computers-Embedded Processors, Winter 1994, pp. 24-30.
Sundararajan, Vijay, et al., Data Transmission Over a bus with Peak-Limited Transition Activity, Proceedings 2000. Design Automation Conference. (IEEE Cat. No. 00CH37106), Jan. 2000, Yokohama, Japan, pp. 221-224.
Tabor, Jeff F., Noise Reduction Using Low Weight and Constant Weight Coding Techniques, MIT Artificial Intelligence Laboratory Technical Report 1232, May 11, 1990.
Torku, Kofi E., et al., Noise Problems in Testing VLSI Hardware, IEEE Design & Test of Computers, Dec. 1985, pp. 36-43.
www.edaboard.com, how to make an 8-3 encoder using 4-2 encoders, Jul. 2010, pp. 1-4 (Year: 2010).
www.electronics-tutorials.ws, binary decoder, Feb. 2014, pp. 1-5 (Year: 2014).
Yang, Jun, et al., FV Encoding for Low-Power Data I/O, ISLPED'01, Aug. 6-7, 2001, Huntington Beach, California, USA, pp. 84-87.

\* cited by examiner

HARDWARE-EFFICIENT PAM-3 ENCODER AND DECODER

CROSS REFERENCE TO RELATED APPLICATIONS

This application claims priority and benefit as a continuation-in-part of application Ser. No. 17/931,062, "Hardware-Efficient PAM-3 Encoder and Decoder", filed on Sep. 9, 2022, the contents of which are incorporated herein by reference in their entirety. Application Ser. No. 17/931,062 claims priority and benefit under 35 U.S.C. 119 to US Application No. 63/328,172, titled "Hardware Efficient PAM3 11bit-7Symbol Encoder/Decoder Design", filed on Apr. 6, 2022, the contents of which are incorporated herein by reference in their entirety.

This application claims priority and benefit under 35 U.S.C. 119 to U.S. application No. 63/321,534, filed on Mar. 18, 2022, and to U.S. application No. 63/329,838, filed on Apr. 11, 2022, and to U.S. application No. 63/330,315, filed on Apr. 13, 2022, the contents of each of which are incorporated herein by reference in their entirety.

BACKGROUND

Dynamic Random Access Memory (DRAM) devices conventionally utilized single-ended PAM2 (Pulse Amplitude Modulation 2-level) signaling. The Graphics Double Data Rate Version 6 (GDDR6x) memory technology introduced PAM-4 (Pulse Amplitude Modulation 4-level) signaling on the DRAM interface and provided a means to boost the DRAM bandwidth despite a DRAM transistor/process limitation, by taking advantage of the voltage margin to encode two bits within a single symbol. PAM-4 also has the potential to increase the horizontal eye margin by operating at a lower baud rate, thereby potentially increasing the operable frequency maximum for the interface.

NRZ (Non-Return-to-Zero) or PAM-2 signaling may operate at a DDR (Double Data Rate) clock of (for example) 12 GHz to support an interface rate of (for example) 24 Gbps (Unit Interval (UI)=41.7 ps). PAM-4 may operate at a DDR clock of (for example) 6 GHz to support an interface rate of (for example) 24 Gbps (UI=83.4 ps, for example), thus achieving higher performance. However, PAM-4 signaling may experience significant eye-closure due to eye-height limitations, and is potentially more susceptible to noise and crosstalk due to a lower signal-to-noise ratio. Low voltage PAM-4 operation makes this issue even more acute.

Schemes used in GDDR6x, such as Maximum Transition Avoidance, alleviate the problem to some extent, but as signaling speeds increase, the overall interface margin reduces, thereby impacting the ability to scale DRAM bandwidth, while increasing complexity and costs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8A and FIG. 8B depict logic 800 for a PAM-3 encoder in one embodiment.

FIG. 12 depicts a table representing the Hamming distance for the possible decoding errors in accordance with one embodiment.

DETAILED DESCRIPTION

Figure 1:
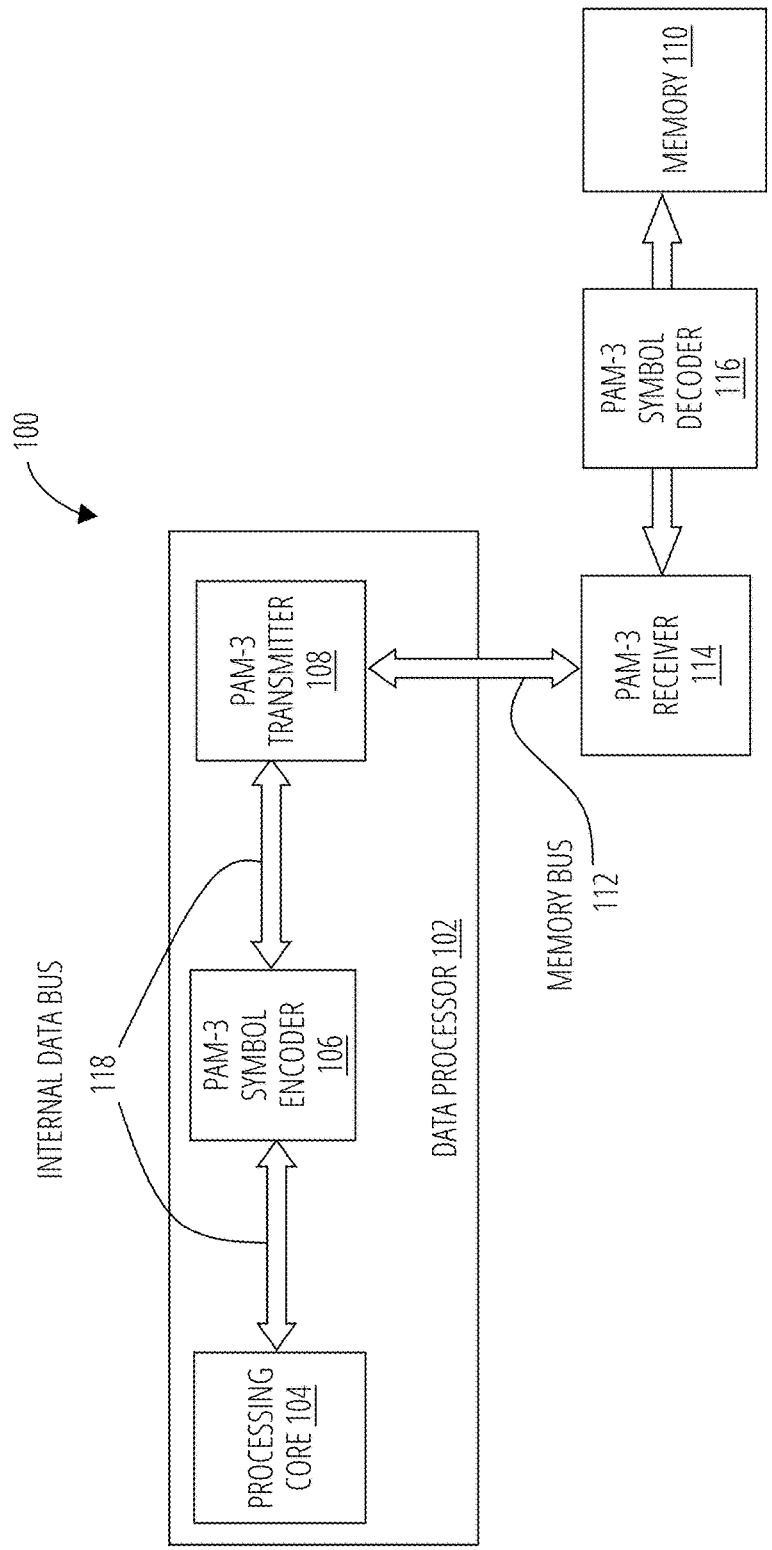
FIG. 1 depicts a data communication system 100 in accordance with one embodiment.

The following description refers to particular pins of a memory bus. Types of memory that may utilize these pins include GDDR SDRAM (Graphics Double Data Rate Synchronous Dynamic Random-Access Memory) and synchronous graphics random-access memory (SGRAM) used in graphics cards, game consoles, and high-performance computing.

Each pin provides a communication channel named for the pin. Therefor in the following description, pin names may also be understood to refer to channels (e.g., one or more metal conductors) of the same name, and vice-versa. Also, the term "pin" should be understood to generally mean an ingress or egress point of signals to and from a circuit (that may be internal to a package), not necessarily an external pin on a circuit package. Table I below provides names for particular pins/channels discussed below and a description of their purpose in operation.

TABLE 1

| | |
|---|---|
| DQ[N:0] | Data Input/Output Pins (data channels) for N parallel Bits |
| DQX | Data Input/Output Extension Pin. The DQX pin/channel may be optionally activated and utilized in high-speed transmission modes, e.g., burst modes. |
| DQY | Another Data Input/Output Extension Pin. The DQY pin/channel may be optionally activated and utilized in high-speed transmission modes, e.g., burst modes. |
| EDC | Error Detection Code Pin. Inter-alia, calculated CRCs for the data transmitted on the DQ and DQX pins are transmitted on the EDC pin/channel. This pin may also be referred to as DQE. |

In a high-speed mode of operation, a memory (e.g., a GDDR SGRAM) may utilize an embodiment of three-level pulse amplitude modulation (PAM-3) encodings described herein on one or more of the pins in Table 1.

Certain terms are used herein and should be understood as follows. Other terms used herein should be accorded their ordinary meaning in the art or understood in the context they are provided.

"Auxiliary data channel" refers to a channel, which may be one or more conductors, that is engaged only in certain communication modes, typically modes of higher-speed communication that a base-level mode. An auxiliary data channel is distinguished from other types of data channels by the fact that it is optional to data communications and not utilized in all modes of operation. Another term for auxiliary data channel is "optional data channel". The DQX and DQY pins are examples of auxiliary data channels.

"Error correction channel" refers to a bus channel, which may comprise a single or multiple signal conductors, that is used to communicate error correction and/or error detection values for communicated data values. In one specific embodiment, the error correction channel is a single conductor (serial bit line) and is the exclusive conductor on the bus for communicating error correction values for data values communicated at least in part over other conductors of the bus. The EDC pin is an example of an error correction channel.

"Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). In some cases processor instructions in certain programming languages may be named "logic"; the distinction will be evident by the context in which the term is applied.

In this description and the claims, 'data bits' should be understood to mean any data, and cyclic redundancy check (CRC) values, poison values, and severity values should be understood to constitute 'meta-data' that is used to interpret or test the data bits. Thus 'data bits' should not be understood to refer to CRC values, poison values, or severity values unless otherwise indicated by context.

PAM-3 signaling may be utilized to increase interface bandwidth while potentially reducing IO (Input/Output) training (configuration) complexity and cost. At comparable frequencies, a PAM-3 interface as disclosed herein may benefit from an increased horizontal and vertical eye margin relative to PAM-4/GDDR6x, and may ameliorate DRAM process and transistor limitations at higher speeds.

An example mapping of PAM3 levels to 2-bit symbols is depicted in Table 2.

TABLE 2

| Level | 2-bit Symbol |
|---|---|
| "+1" | "11" |
| "0" | "01" |
| "−1" | "00" |

PAM-3, given its ternary nature, has less data encoding capacity per symbol than PAM-4 and thus requires more pins on the interface to transmit the same information at the same frequency. Techniques such as Cycle-Redundancy Check (CRC) bits may be utilized to provide random and burst error detection. For example, an 18-bit CRC per 256 bits of data may utilized. For write operations, one (1) poison data bit per 256 bit access enables the host device to mark/preserve on-chip data errors in the DRAM. This poison information is stored in the DRAM on writes that are known by the host to have erroneous data. On reads, the poison flag for the address in question is transferred back to the host as a means of error preservation or containment. In addition, a severity bit may be utilized with read operations to indicate to the host that the corresponding data on the DRAM has suffered an uncorrectable error.

Combined, this means that the total payload for 256 bits of data includes 18 bits of CRC, one poison bit, and one severity bit. The techniques herein enable implementations to encode and map this information on to a PAM-3 transmitter and receiver, e.g., between a processor and a DRAM, with throughput comparable to PAM-4 at comparable interface frequencies.

In one embodiment, a 12-pin interface is utilized to communicate two (2) PAM-3 symbols with every three (3) bits, i.e. two PAM-3 symbols encode three binary bits. This encoding may be abbreviated as '3b2s'. The 3b2s encoding may be utilized for every symbol communicated for bursts comprising 256 bits of data, 18 bits of CRC code, one poison bit, and one severity bit. The logic (e.g., circuit hardware) for such an encoder/decoder is relatively non-complex (see FIG. 9). However, this embodiment utilizes 12 pins, a drawback.

Other embodiments may utilize more efficient encodings that minimize the following expression: $(2^b - 3^T)$, where b is the number of bits and T is the number of symbols. These encodings may achieve a greater data density at the expense of more complex hardware for the encoder and/or decoder. One such encoding may be expressed as 11b7s, meaning that 11 bits are utilized to communicate every 7 symbols. Three example techniques that utilize these encodings are described herein.

Figure 10:
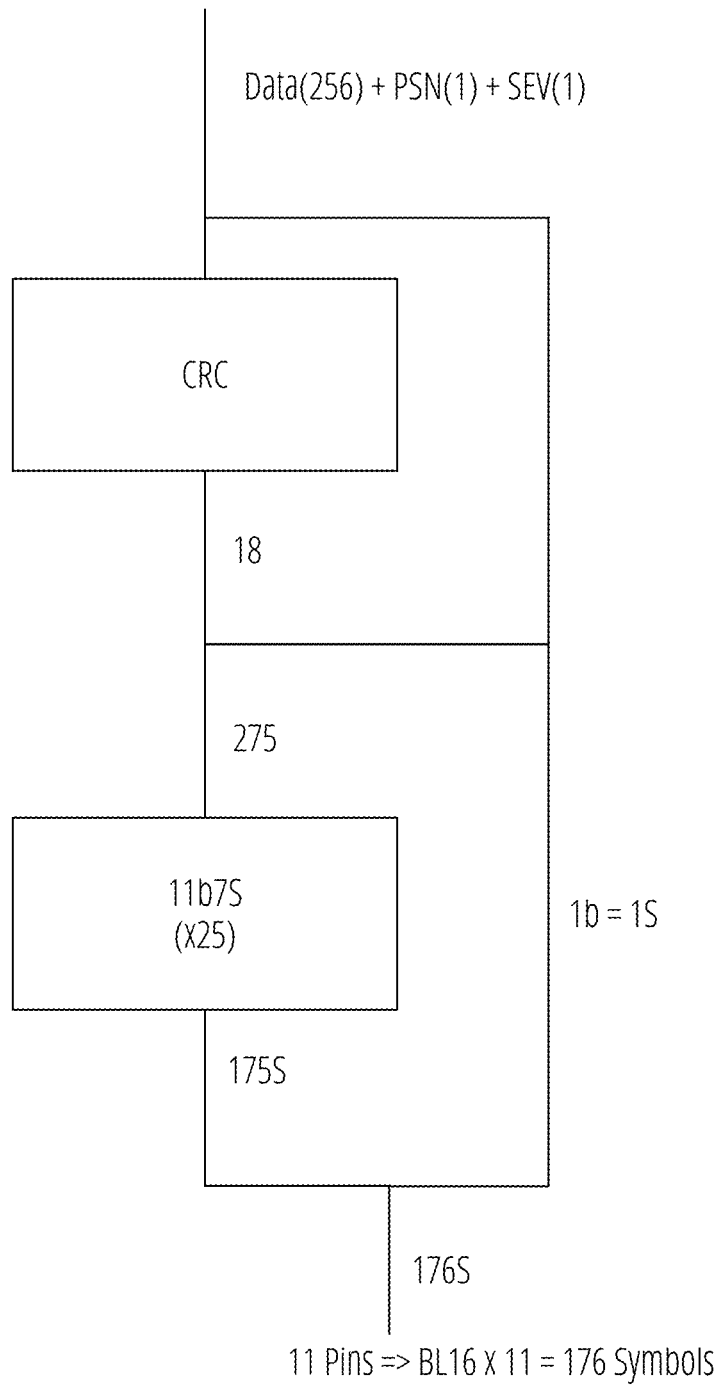
FIG. 10 depicts an encoder in accordance with another embodiment.

A first embodiment utilizes twenty-three (23) 11b7s-type encodings to map 253 data bits to 161 PAM-3 symbols, three (3) data bits plus eight (8) CRC bits to another seven (7) PAM-3 symbols, ten (10) CRC bits plus one (1) poison bit to another seven (7) PAM-3 symbols, and one (1) severity bit to another one (1) PAM-3 symbol. This amounts to utilization of 161+7+7+1=176 symbols. In these embodiments, on interfaces with eleven (11) IO pins, the 176 total symbols may all be communicated in a sixteen (16) symbol, 32 bit (per IO pin) burst. Example logic for this embodiment is depicted in FIG. 10. A potential drawback of such embodiments is error multiplication due to the encoding of the CRC bits with the 11b7s algorithm, which may in turn impact CRC efficacy for random errors.

Figure 11:
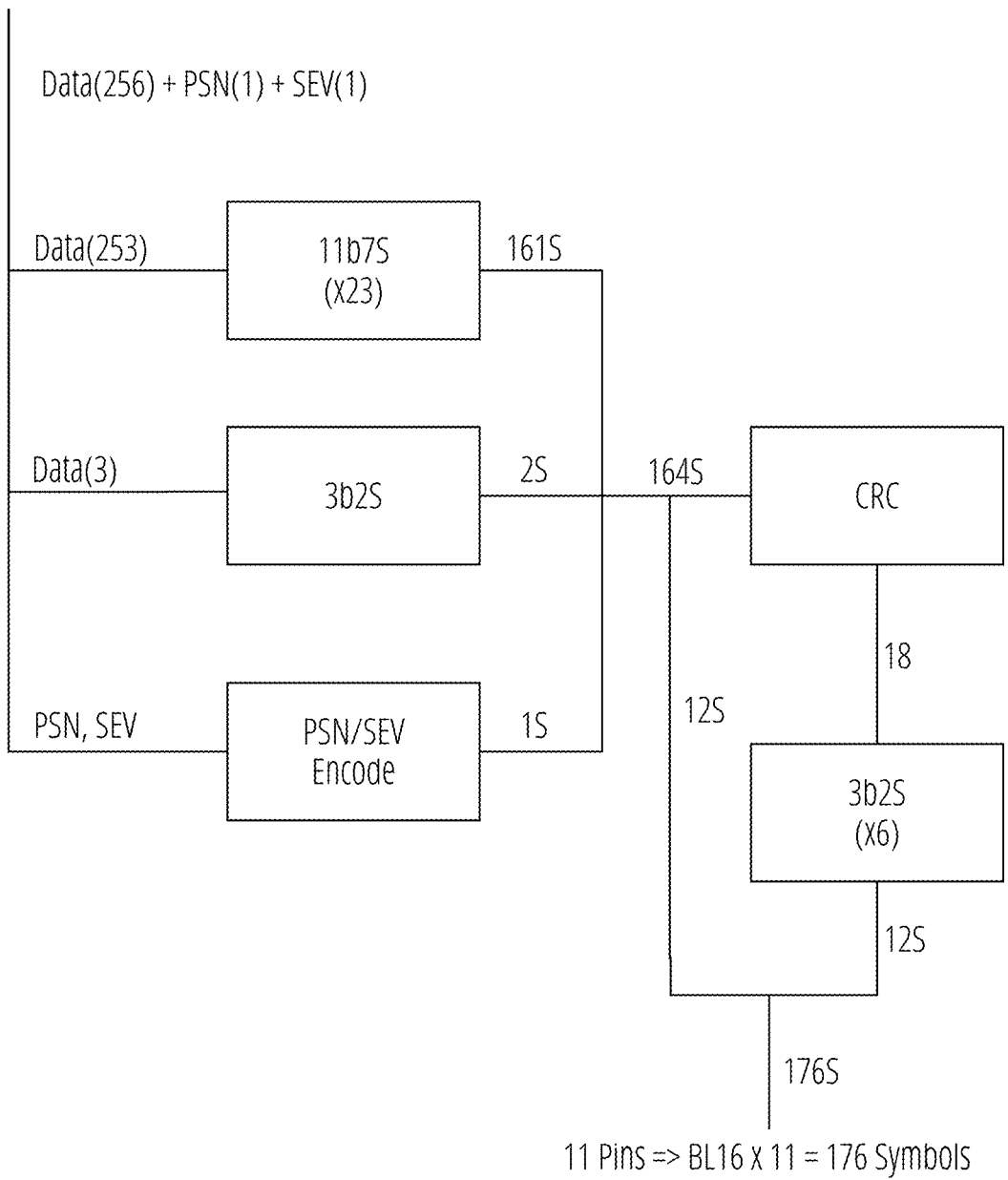
FIG. 11 depicts an encoder in accordance with yet another embodiment.

A second embodiment also utilizes twenty three (23) 11b7s-type encoding that map 253 data bits to 161 symbols. However this embodiment utilizes one (1) 3b2s-type encoding to map three (3) data bits to two (2) PAM-3 symbols, and six (6) additional 3b2s-type encodings to map eighteen (18) CRC bits to twelve (12) PAM-3 symbols. The poison bit and the severity bit are made mutually exclusive and encoded as one PAM-3 symbol; a zero (0) value of the symbol may indicate (no poison, no severity), a value of one (1) may indicate (poison, no severity), and a value of two (2) may indicate (severity, no poison). This amounts to utilization of 161+2+12+1=176 symbols. Example logic for this embodiment is depicted in FIG. 11.

In these embodiments, on interfaces with eleven (11) IO pins, the 176 total symbols may all be communicated in a sixteen (16) symbol (per IO pin) burst. Because the CRC bits are encoded using 3b2s-type encoding, these embodiments may not incur the error amplification problem of the first embodiment. However, due to the mutually exclusive assumption of poison and severity, a host device utilizing these embodiments cannot get information of uncorrectable errors on memory locations that are carrying poisoned data. Depending on the resiliency requirements of the system, this constraint may be acceptable.

A third embodiment utilizes the encodings of the second embodiment, except that the poison and severity bits are encoded as data using specific codewords reserved for these bits. When either a poison or severity event occurs, data integrity is a "don't care" (due to the inherent nature of poison/severity). A previously "unused" encoding for the data bits from one of the 11b7s mapping blocks may be utilized to represent poison. Two other unused encodings may represent severity, or severity and poison simultaneously. This approach utilizes 175 total PAM-3 symbols, one fewer than the other two embodiments, with the ability to independently indicate poison and severity, no CRC error multiplication, and one spare symbol that may be used to communicate additional meta-data about the burst.

A particular implementation may utilize one or a combination of these embodiments for both the read and write directions, or differently for read and for write, depending on the desired level of complexity, power consumption and area on the encoder and decoder logic.

Generally, transmitters are described comprising logic to encode eleven bits as seven pulse amplitude modulated three-level (PAM-3) symbols (11b7s encoded symbols) on eight data channels and two auxiliary data channels, and logic to encode a cyclic redundancy check (CRC) value, a poison value, and a severity value as PAM-3 symbols utilizing either 11b7s or 3b2s encoding. Specific embodiments are described that encode the cyclic redundancy check (CRC) value, poison value, and/or severity value on the error correction channel; however in general, these values may be encoded on the error correction channel and/or auxiliary data channels. In one embodiment the cyclic redundancy check value, the poison value, and the severity value are 11b7s encoded; in other embodiments some or all of these values are 3b2s encoded. In one embodiment the poison value and the severity value are encoded using 11b7s encoding and communicated on one of the data channels.

In some embodiments, three bits of data are encoded as 3b2s symbols, for example on the error correction channel. The poison value and the severity value are encoded as one 3b2s symbol in some embodiments.

Other technical features and embodiments may be readily apparent to one skilled in the art from the following figures, descriptions, and claims.

Referring to FIG. 1, a data communication system 100 comprises a transmitting device such as a data processor 102 that includes a processing core 104, PAM-3 symbol encoder 106, and a PAM-3 transmitter 108. The data processor 102 may in some embodiments comprise a graphics processing unit (GPU), a central processing unit (CPU), a system on a chip (SoC), or other well-known data processing devices.

The data processor 102 communicates with a receiving device such as a memory 110 over a bus such as a memory bus 112. A PAM-3 receiver 114 and PAM-3 symbol decoder 116 receive and process PAM-3 signals communicated from the data processor 102 to the memory 110 over the memory bus 112.

The data processor 102 utilizes an internal data bus 118 to transmit data bursts to and from the processing core 104 over a multi-lane internal data bus 118. The PAM-3 symbol encoder 106 receives a burst of data to encode from the processing core 104 and performs PAM-3 encoding on that burst. The PAM-3 transmitter 108 transmits the encoded burst to the PAM-3 receiver 114 via the memory bus 112. The PAM-3 receiver 114 receives the encoded burst and sends the encoded burst to the PAM-3 symbol decoder 116 to decode the burst. Once decoded, the burst is sent to the memory 110.

This is a simplified diagram. In practice, there would typically be encoders and decoders on both ends of the memory bus 112 for both writing to and reading from the memory 110.

Figure 2:
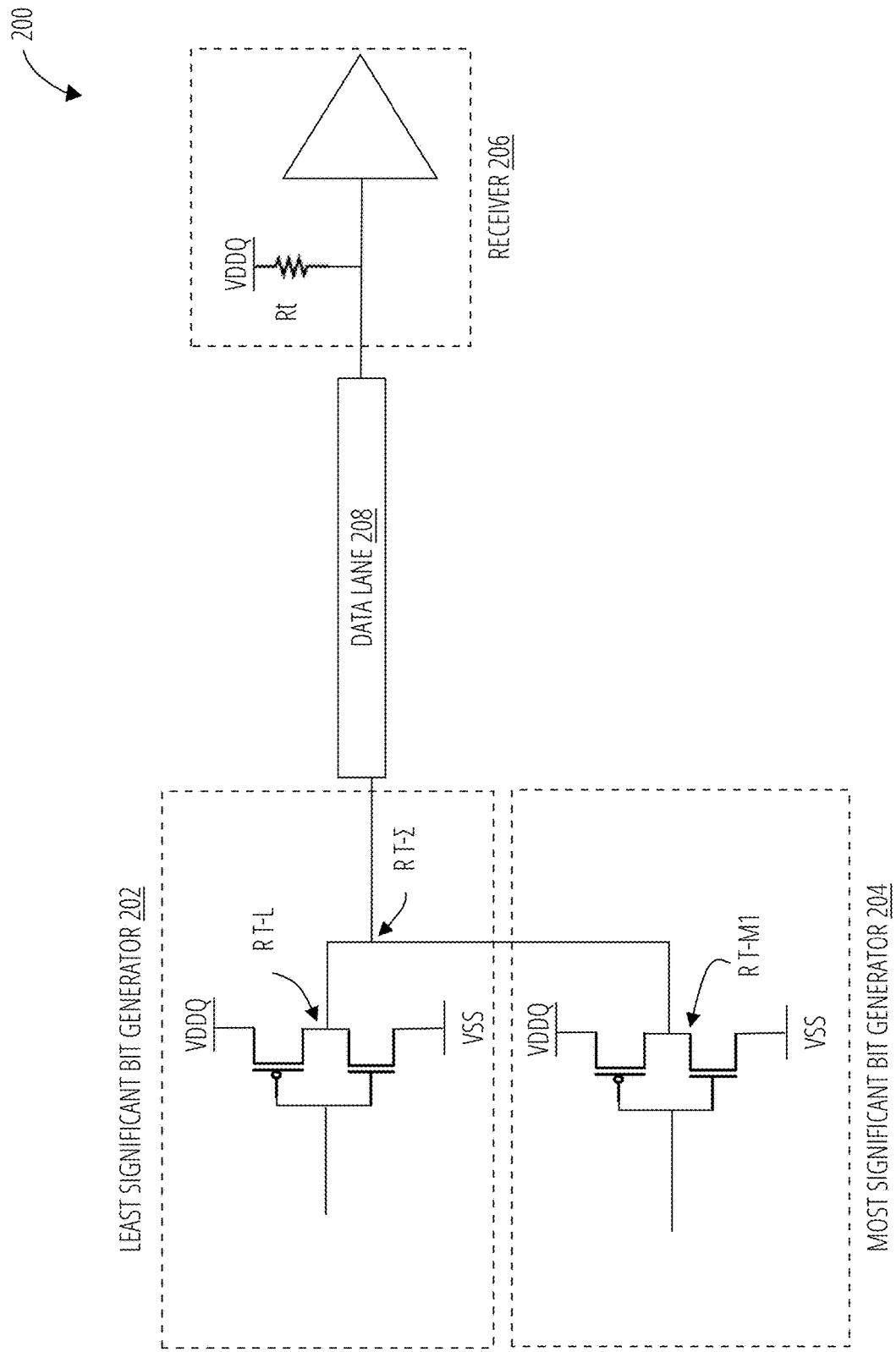
FIG. 2 depicts an embodiment of a PAM-3 transceiver 200.

FIG. 2 depicts a PAM-3 transceiver 200 for a single data lane of a serial data bus in one embodiment. The exemplary PAM-3 transceiver 200 (embodiments with fewer transistors may also be implemented) comprises a least significant bit transmitter 202, a most significant bit transmitter 204, a receiver 206, and a data lane 208. The PAM-3 transceiver 200 utilizes the least significant bit transmitter 202 and the most significant bit transmitter 204 to generate a three-level symbol (a similar arrangement may also be utilized to generate a four-level symbol for PAM-4 communication) on the data lane 208. One PAM-3 symbol represents one of three binary values; two PAM-3 symbols represent one out of nine possible binary values, and so on. Herein the term "symbol" refers to a voltage level generated by a line driver on a serial data bus data lane, where the voltage level represents the value of one or more bits of data. Thus "encoding a symbol" means physically configuring a line driver circuit of the serial data bus to drive the voltage on the data lane to a particular value.

When the bit pair to encode is 00, both drivers output VSS, yielding the lowest voltage symbol. When the bit pair to encode is 01, the least significant bit transmitter 202 outputs VDDQ and the most significant bit transmitter 204 outputs VSS, yielding the middle symbol voltage. When the bit pair is 11, both drivers output VDDQ, yielding the highest symbol voltage.

Figure 3:
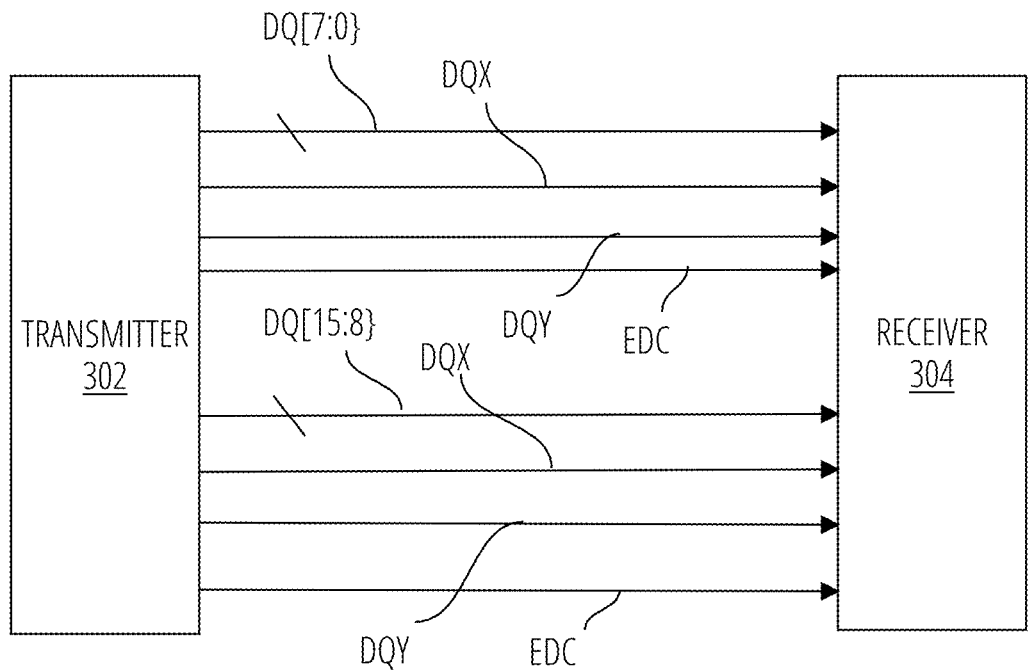
FIG. 3 depicts a system in accordance with one embodiment.

FIG. 3 depicts a system comprising a transmitter 302, a receiver 304, and two sets of eight parallel data channels DQ[7:0] and DQ[15:8] coupling the transmitter 302 to the receiver 304. Each set of data channels has two associated auxiliary data channels DQX and DQY and an error correction channel EDC (also called DQE). In accordance with the embodiments disclosed herein, the system may include logic (e.g., in the transmitter or in a distinct controller that operates the transmitter) to communicate bursts of PAM-3 symbols encoded in accordance with the techniques described herein, e.g., 11b7s, 3b2s, and combinations thereof.

Figure 4:
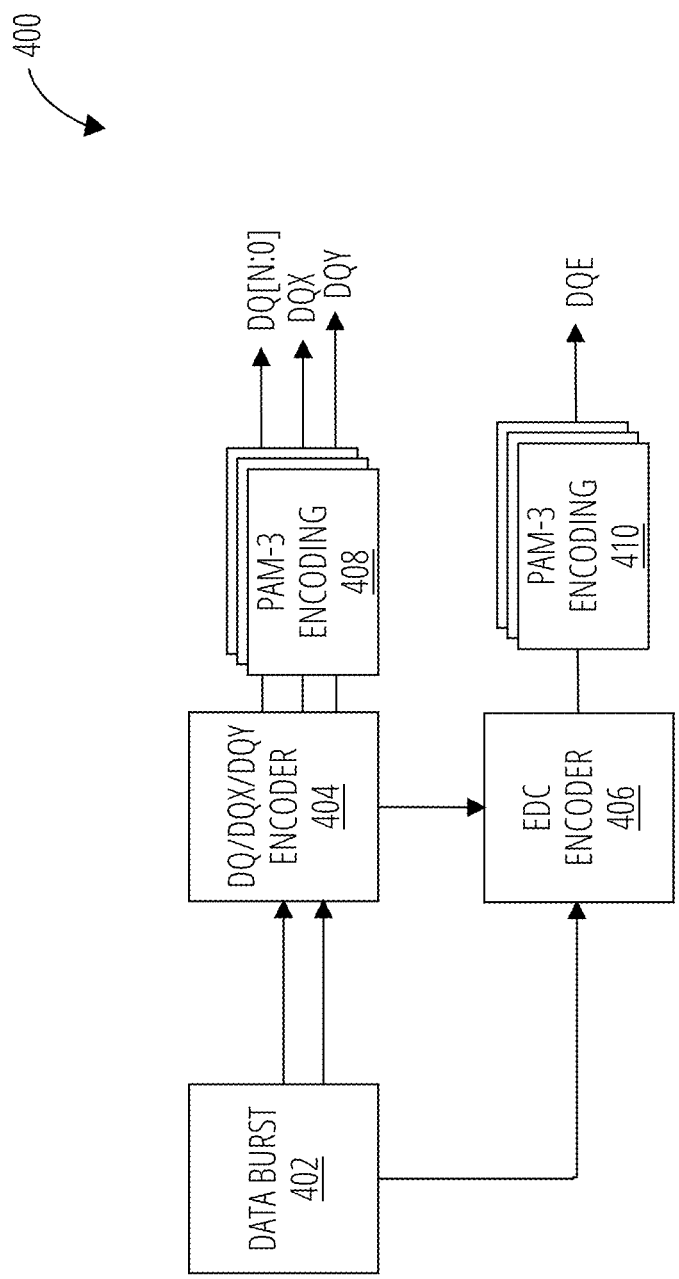
FIG. 4 depicts a burst read system 400 in accordance with one embodiment.

FIG. 4 depicts a burst read system 400 in one embodiment. A data burst 402 from a memory device is input to both of a DQ/DQX/DQY encoder 404 and an EDC encoder 406 (e.g., in parallel) and transformed into PAM-3 encoding 408 and PAM-3 encoding 410 which together represent a transmission of both the data burst 402 and a CRC for the data burst 402 on the DQ[N:0]/DQX channels and EDC channels, respectively.

Figure 5:
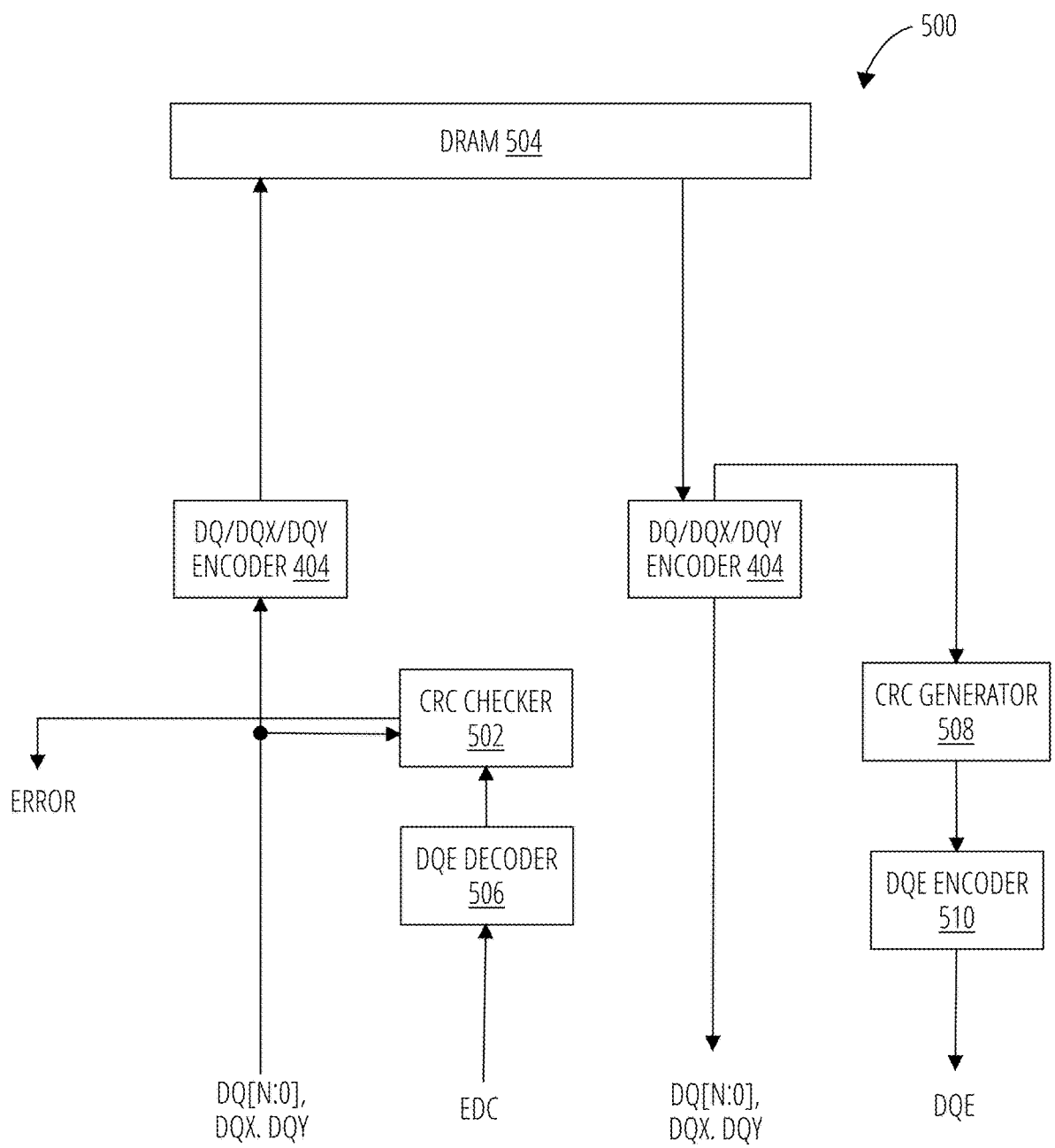
FIG. 5 depicts a machine memory system 500 in accordance with one embodiment.

FIG. 5 depicts a machine memory system 500 in one embodiment. The machine memory system 500 may for example be a GDDR SGRAM.

Data for WRITE operations undergoes a CRC check by the CRC checker 502, and is decoded by a DQ/DQX/DQY encoder 404 before being written to the DRAM 504. The CRC checker 502 operates on the DQ/DQX/DQY channel data bits and also on the DQE channel bits output from the DQE decoder 506. On READ operations from the DRAM 504, a CRC is generated for the data bits by the CRC generator 508, the data bits are encoded onto the DQ/DQX/DQY lines by the DQ/DQX/DQY encoder 404, and the CRC is encoded onto the DQE channel by the DQE encoder 510.

Figures 6A, 6B:
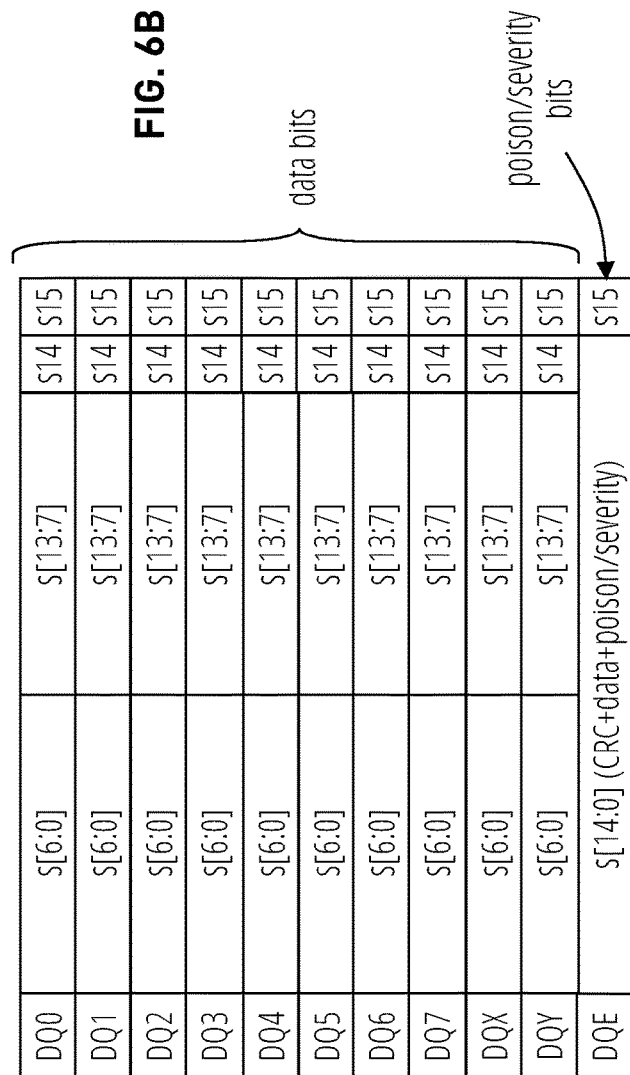
FIG. 6A and FIG. 6B depict an exemplary PAM-3 encoding and symbol distribution over the various DQ/DQX/DQY/DQE channels.

FIG. 6A and FIG. 6B depict an exemplary PAM-3 encoding and symbol distribution over the various DQ/DQX/DQY/DQE channels. For both the raw data and the encoded data (symbols), each row DQ[i] represents a serial data channel. In the raw data, the columns are sequential bit positions in 32-bit data bursts. For example, 11 sequential bits are represented in the column labeled b[10:0]. Each burst of 32 bits is represented on each serial DQ channel as three sets of 11 bits, 11 bits, and 10 bits each. For example, on DQ[0], in FIG. 6A the 32-bit double burst is conceptually divided into a first part b[10:0], a second part b[21:11], and a third part b[22:31]; FIG. 6B depicts the corresponding encoding of these bits into symbols on DX[0]. In FIG. 6B s[6:0] represents seven symbols encoding the raw bits b[10:0]. A total of 16 symbols are utilized to encode the 256 bits of raw data in the burst. The raw data values are mapped onto the DQ, DQX, DQY, and DQE channels as PAM-3 symbols as depicted, with a mixture of 11b7s and 3b2s encodings in accordance with the embodiments previously described.

Various embodiments utilizing 11b7s mappings are possible and a particular implementation may adopt a combination of different mappings for read and write directions depending on the desired level of complexity, power consumption and area constraints on the encoder and decoder logic.

Figure 7:
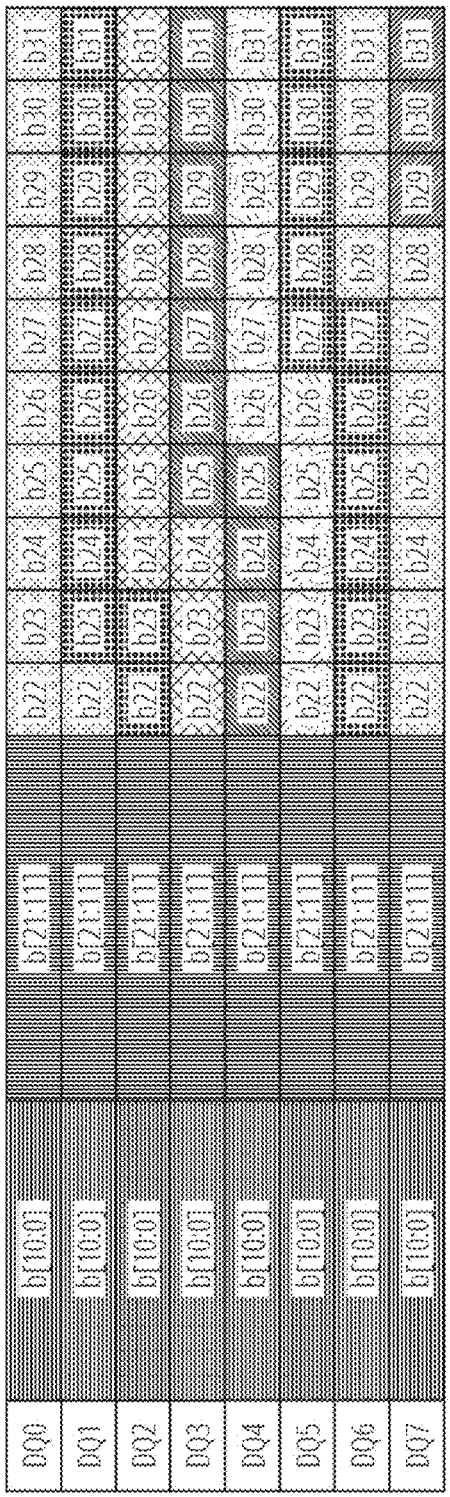
FIG. 7 depicts another exemplary PAM-3 encoding and symbol distribution over the various DQ/DQX/DQY/DQE channels.
Figure 7:
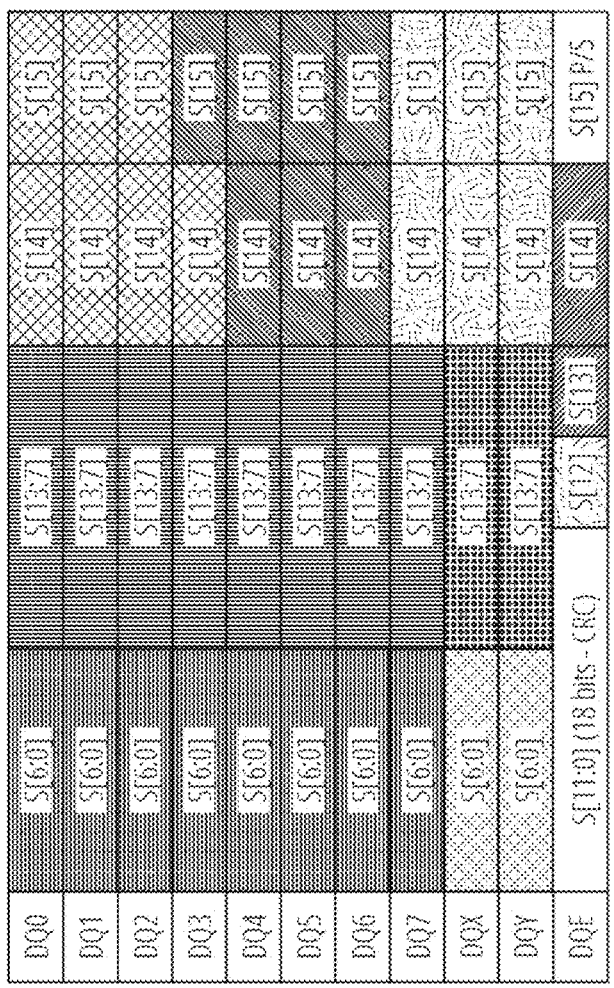

FIG. 7 depicts an example mapping for a 16-bit burst length across 11 IO pins. This mapping may be utilized for example in the embodiment described in conjunction with FIG. 11 below.

Figure 8A:
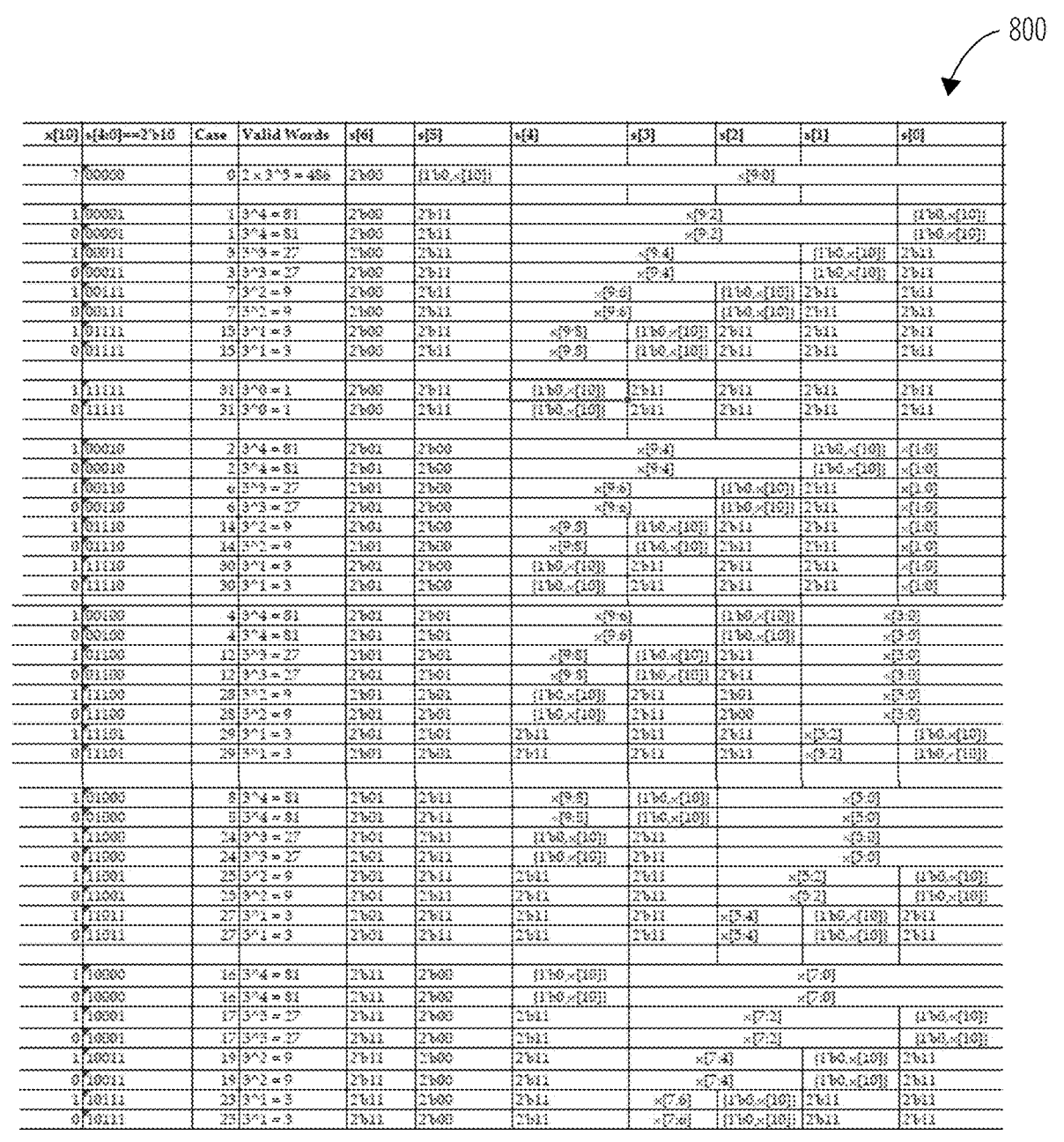
Figure 8B:
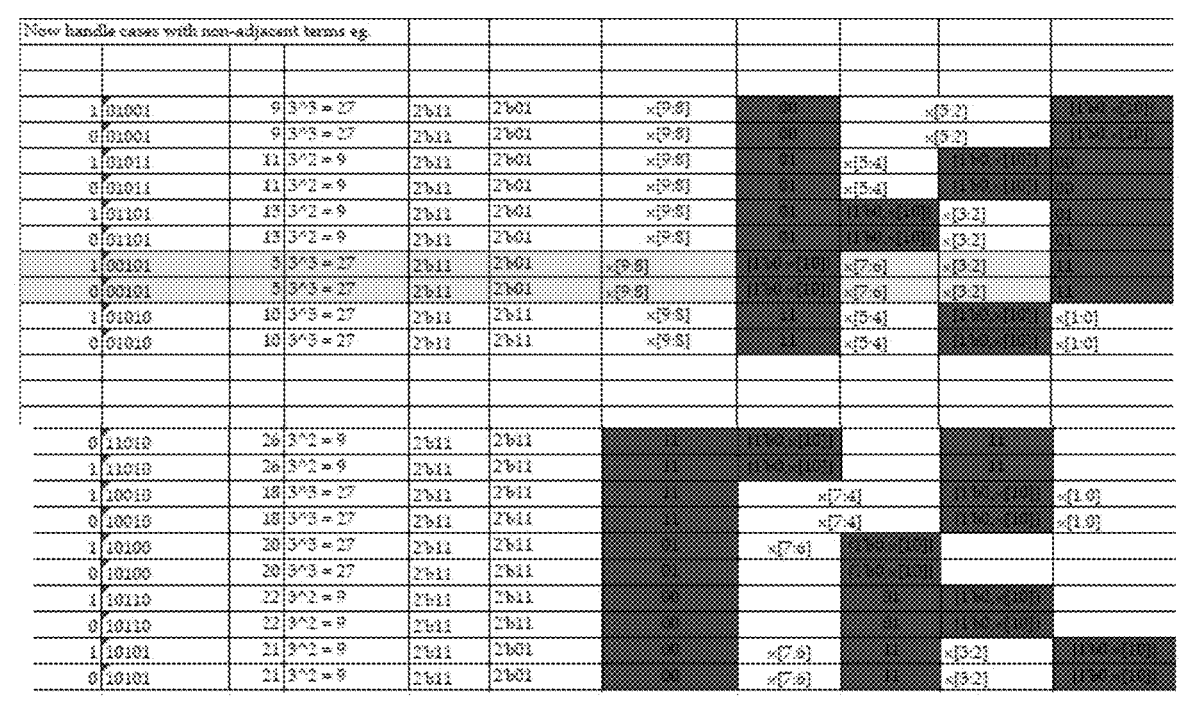

FIG. 8A and FIG. 8B depict logic 800 for a PAM-3 encoder in one embodiment. Exemplary algorithms to implement such logic (both encoding and decoding) are provided in Listing I and Listing II.

PAM-3 encodings in accordance with the techniques disclosed herein, utilizing DQ, DQX, DQY, and DQE channels, may achieve transmission rates of >90%, and even 99% or greater, of the transmission rate of PAM-4 techniques over DQ, DQX, and DQE, but may be implemented with significantly less circuit area and complexity (this may also translate into power savings). PAM-3 may achieve a wider signal eye than PAM-4, and may enable voltage scaling to reduce power during transmissions (e.g., for applications such as mobile devices).

Figure 9:
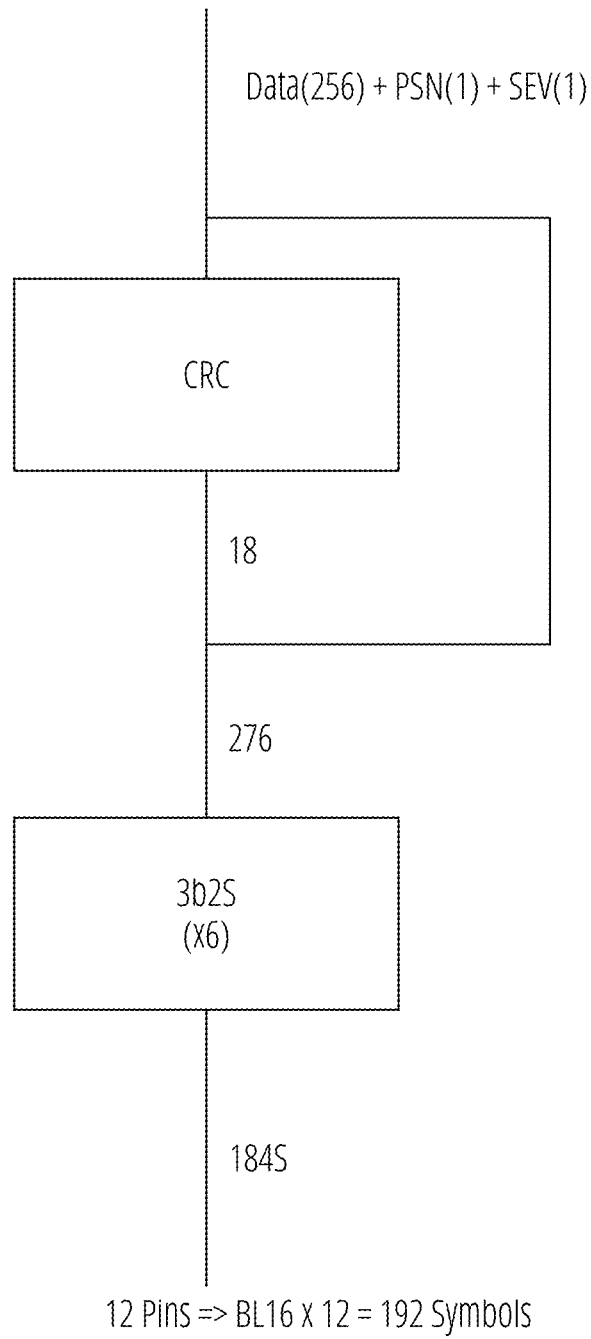
FIG. 9 depicts an encoder in accordance with one embodiment.

FIG. 9 depicts an encoder in accordance with one embodiment. A 12-pin interface (e.g., memory bus) generates an 18-bit CRC on 256 bits of data, one poison bit, and one severity bit. The interface applies to 3b2T encoding to the resulting 276 bits. The simplicity of the 3b2T encoding in relation to other encoding techniques reduces the encoder logic complexity, power consumption, and area.

FIG. 10 depicts an encoder in accordance with another embodiment. The encoder generates 25 11b7s encodings to map 256 data bits, 18 CRC bits and 1 Poison bit to 175 2-bit symbols over three levels (trits). The severity bit is encoded by an additional 1 trit, for a total of 176 trits used. This embodiment may potentially incur error multiplication as the CRC itself is encoded using 11b7s and may impact the CRC efficacy.

FIG. 11 depicts an encoder in accordance with yet another embodiment. The encoder generates 23 11b7s encodings to transform 253 data bits into 161 trits. A single 3b2T encoding transforms three (3) data bits to two (2) trits, and six (6) 3b2T encodings are generated for transforming 18 CRC bits to 12 trits.

Poison/Severity is made mutually exclusive and encoded as two bits in one (1) trit. For example a value of zero (0) for this bit may indicate (no Poison, no Severity), a value of one (1) means (Poison, No severity), and value of two (2) may indicate (Severity, no Poison). For purposes of encoding, Severity may be the prioritized setting (with the value of Poison omitted/left ambiguous) in situations where both Poison and Severity bits are set in the DRAM.

Encoders in conformance with the embodiment depicted in FIG. 11 may be utilized to communicate bursts of 176 trits over eleven (11) I/O pins while avoiding or mitigating the error amplification issues of the embodiment described in FIG. 10. To avoid or mitigate error amplification, the 3b2T encoding may be ternary Gray Coded for example as depicted in the algorithm of Table 3 below.

Due to the mutually exclusive assumption of Poison and Severity, s host device (e.g., a memory controller) cannot get information of uncorrectable errors on DRAM locations that are carrying poisoned data. Depending on the resiliency requirements of the system, this restriction may be acceptable.

TABLE 3

| 2 trits | | 3-bit binary | | |
|---|---|---|---|---|
| 3 | 3 | 1 | 1 | 1 |
| 3 | 1 | 1 | 1 | 0 |
| 3 | 0 | 1 | 0 | 0 |
| 1 | 0 | 1 | 0 | 1 |
| 1 | 1 | ERR | ERR | ERR |
| 1 | 3 | 0 | 1 | 1 |
| 0 | 3 | 0 | 1 | 0 |
| 0 | 1 | 0 | 0 | 0 |
| 0 | 0 | 0 | 0 | 1 |

Figure 12:
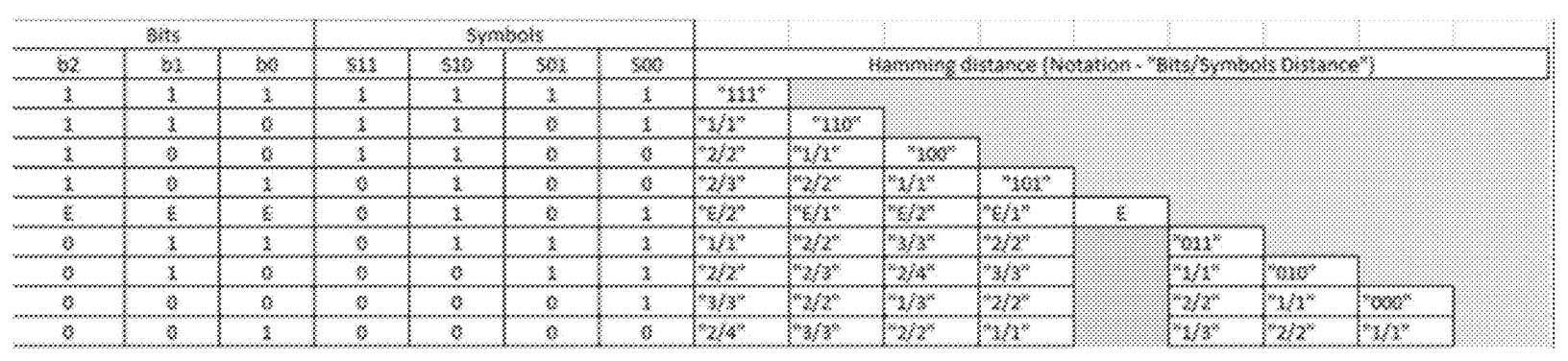

FIG. 12 depicts a table representing the Hamming distance for the possible decoding errors. Table 4 provides another example 3b2T encoding that may be used. An exemplary algorithm to generate encoders with the Hamming properties of interest is provided in Listing III.

TABLE 4

| 2 trits | | 3-bit binary | | |
|---|---|---|---|---|
| 3 | 3 | 0 | 1 | 1 |
| 3 | 1 | 1 | 1 | 1 |
| 3 | 0 | 1 | 1 | 0 |
| 1 | 3 | 0 | 1 | 0 |
| 1 | 1 | ERR | ERR | ERR |
| 1 | 0 | 1 | 0 | 0 |
| 0 | 3 | 0 | 0 | 0 |
| 0 | 1 | 0 | 0 | 1 |
| 0 | 0 | 1 | 0 | 1 |

A 3b2T encoding algorithm exemplified in Table 3 and Table 4 obviates any error multiplication from single- or two-level errors on one or both trits of the two-trit pair. In the tables the voltage levels of the symbols are represented as 3 (+1), 1 (0), 0 (—1). The encoding algorithm ensures that the error distance/Hamming distance between any pair of ternary codes is always greater than or equal to the distance between corresponding binary code, thereby avoid error amplification. An additional benefit is that in situations where the ternary code Hamming distance is greater than the binary code Hamming distance, these encodings may tend to alleviate and/or reduce errors on the interface.

Other 3b2T encodings comprising similar Hamming distance characteristics may also be used for similar avoidance or reduction of error multiplication. There are 96 such possibilities that meet the Hamming distance criterion: Hamming Distance (ternary symbol)>=Hamming Distance (binary symbol). In these cases the middle symbols (1,1) are assigned to error codes because they correspond to the maximum number of HD=1 codes.

The 1,1 symbol pair may be used to further improve the error coverage on the pins that use this encoding. On the receive decoder, a 1,1 symbol pair may be detected as an unused error symbol to capture the interface error on the corresponding pin. This error from the 3b2T decode can be communicated as a separate error or added to the CRC error condition/notification (see FIG. 13).

In another embodiment, the encoder generates 23 11b7s encodings to transform 253 data bits into 161 trits. A single 3b2T encoding transforms three (3) data bits to two (2) trits, and six (6) 3b2T encodings are generated for transforming 18 CRC bits to 12 trits. This embodiment takes advantage of the fact that when either the Poison or Severity bit is set, data integrity is a "don't care" (due to the inherent nature of Poison/Severity). Different from the embodiment depicted in FIG. 11, an available 11b7s encoding is utilized to represent the value of the Poison bit. Two other encodings may be utilized to represent Severity, or Severity and Poison simultaneously.

This embodiment utilizes 175 trits, and retains the ability to independently indicate poison and severity, without CRC error multiplication (assuming ternary gray coding) and one spare trit for applications such as communicating additional meta-data about the data burst.

Figure 13:
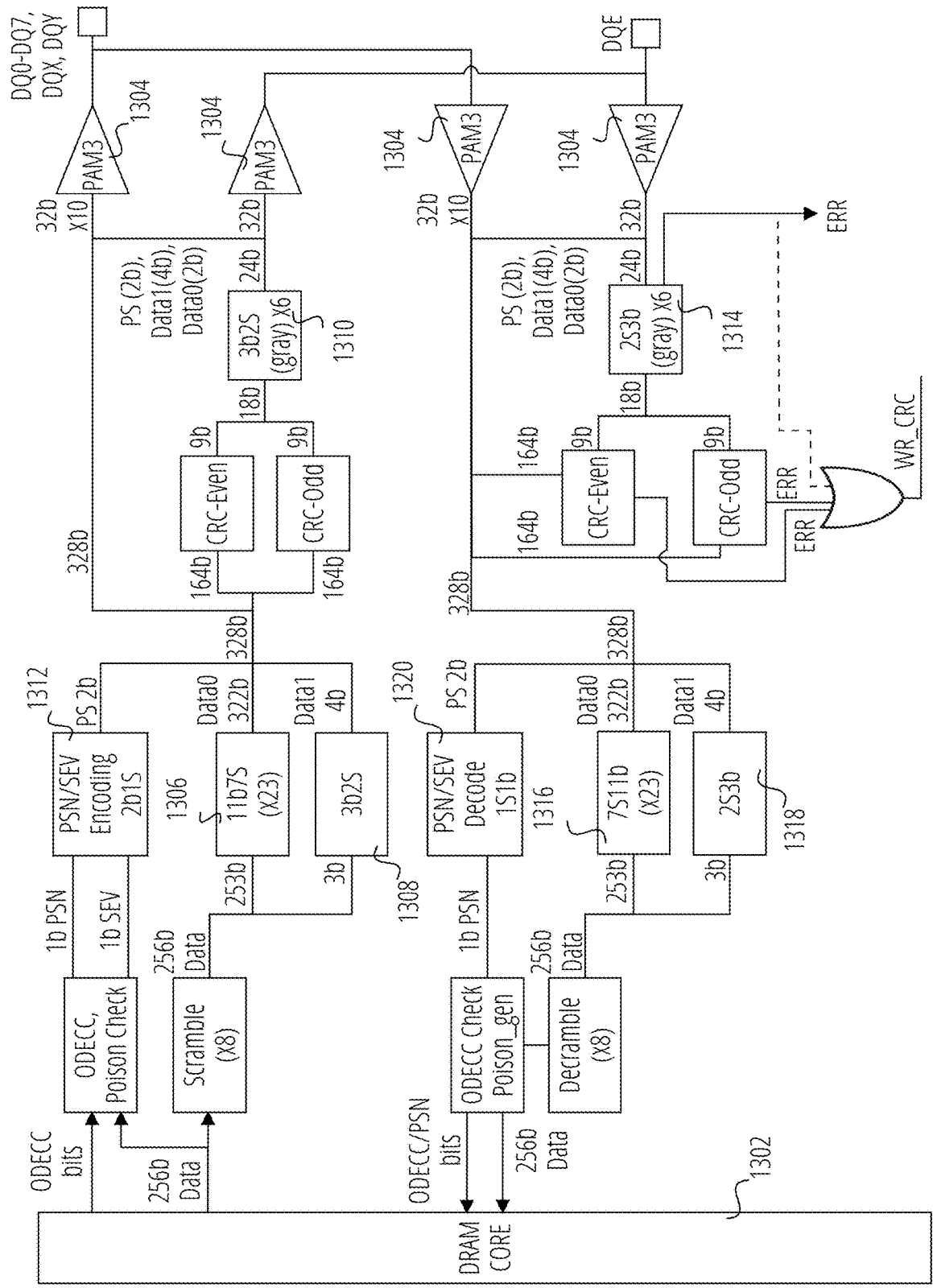
FIG. 13 depicts a memory bus in accordance with one embodiment.
Figure 14:
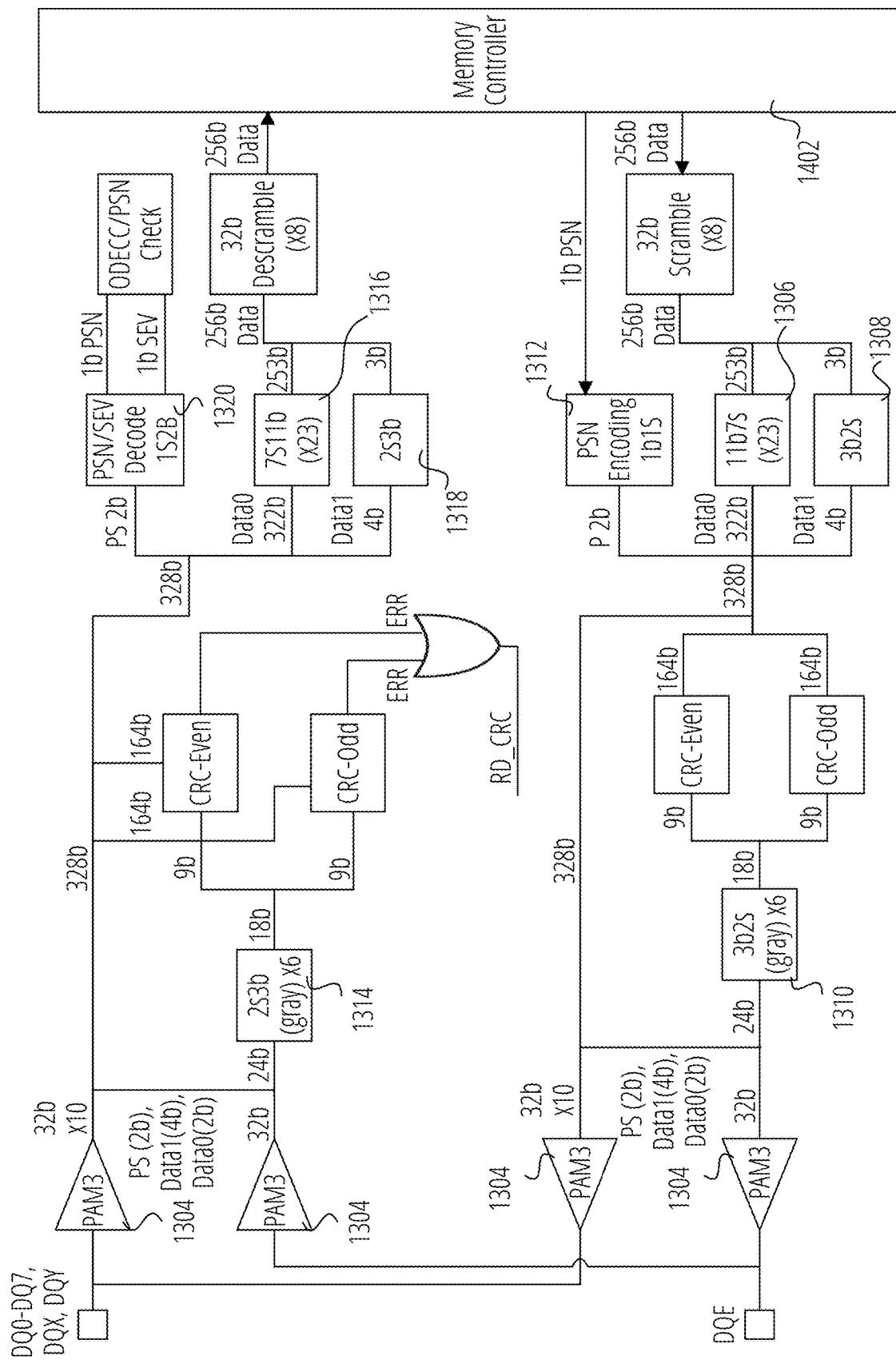
FIG. 14 depicts a memory bus in accordance with another embodiment.

FIG. 13 depicts a logic to encode and decode symbols between memory cells 1302 and a memory bus in accordance with one embodiment. FIG. 14 depicts similar logic to encode and decode symbols between a memory controller 1402 and the memory bus.

FIG. 13 and FIG. 14 depict one embodiment of the mapping of data, CRC, Poison and Severity to 11 PAM3 interface pins. Data is read from the memory cells 1302, encoded, and communicated over the channels as symbols generated by the PAM 3 driver 1304 circuits.

For data read from the memory cells 1302, the depicted embodiment in FIG. 13 generates 23 11b7T encodings (11b7s encoder 1306) to map 253 data bits to 161 trits, one 3b2T encoding (3b2s encoder 1308) to map three data bits to two trits, and six 3b2T encoding to map 18 CRC bits to 12 trits (3b2s gray encoder 1310). Poison and Severity are made mutually exclusive and encoded as one trit (poison/severity encoder 1312) where a value of zero indicates (no Poison, no Severity), a value of one means (Poison, No severity), and a value of two means (Severity, no Poison). Severity is prioritized in the situation in which both Poison and Severity are set in the DRAM. For each 256 bit data burst, this encoding comprises a total of 176 trits mapped onto eleven I/O pins.

For data written to the memory cells 1302, the depicted embodiment in FIG. 13 decodes 18 bits of CRC code (2s3b gray decoder 1314) and decodes 256 bits of data-253 bits from the 23 11b7T encodings (7s11b decoder 1316) and three bits from the 3b2s encoding (2s3b decoder 1318). The Poison and Severity trit is also decoded into mutually exclusive flags (poison/severity decoder 1320).

The CRC error output depicted in both FIG. 13 and FIG. 14 may be communicated to a host device as an independent error signal, or may be combined with a write-CRC error signal to the memory controller (e.g., DRAM controller). The host device may apply the error from the CRC decoder (on reads) as an independent error signal or may combine it with a read-CRC error from the memory controller.

Additional components are also depicted, showing the order and organization of scrambling, encoding, and CRC generation for reads and writes. The function and design of these additional components will be familiar to those of skill in the art.

Embodiments of the encoder and decoder devices and algorithms described herein may be utilized in computing devices comprising one or more graphic processing unit (GPU) and/or general purpose data processor (e.g., a 'central processing unit or CPU). Exemplary systems will now be described that may be configured with such devices. In particular encoding and decoding techniques in accordance with the embodiments described herein may be utilized anywhere data or instructions are communicated between components of the exemplary systems described below (e.g., between a data parallel processing unit 1502 and a memory 1504, over a crossbar 1506, between a parallel processing unit 1902 and a memory 1904, between a central processing unit 1906 and a parallel processing unit 1902, etc.).

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 15:
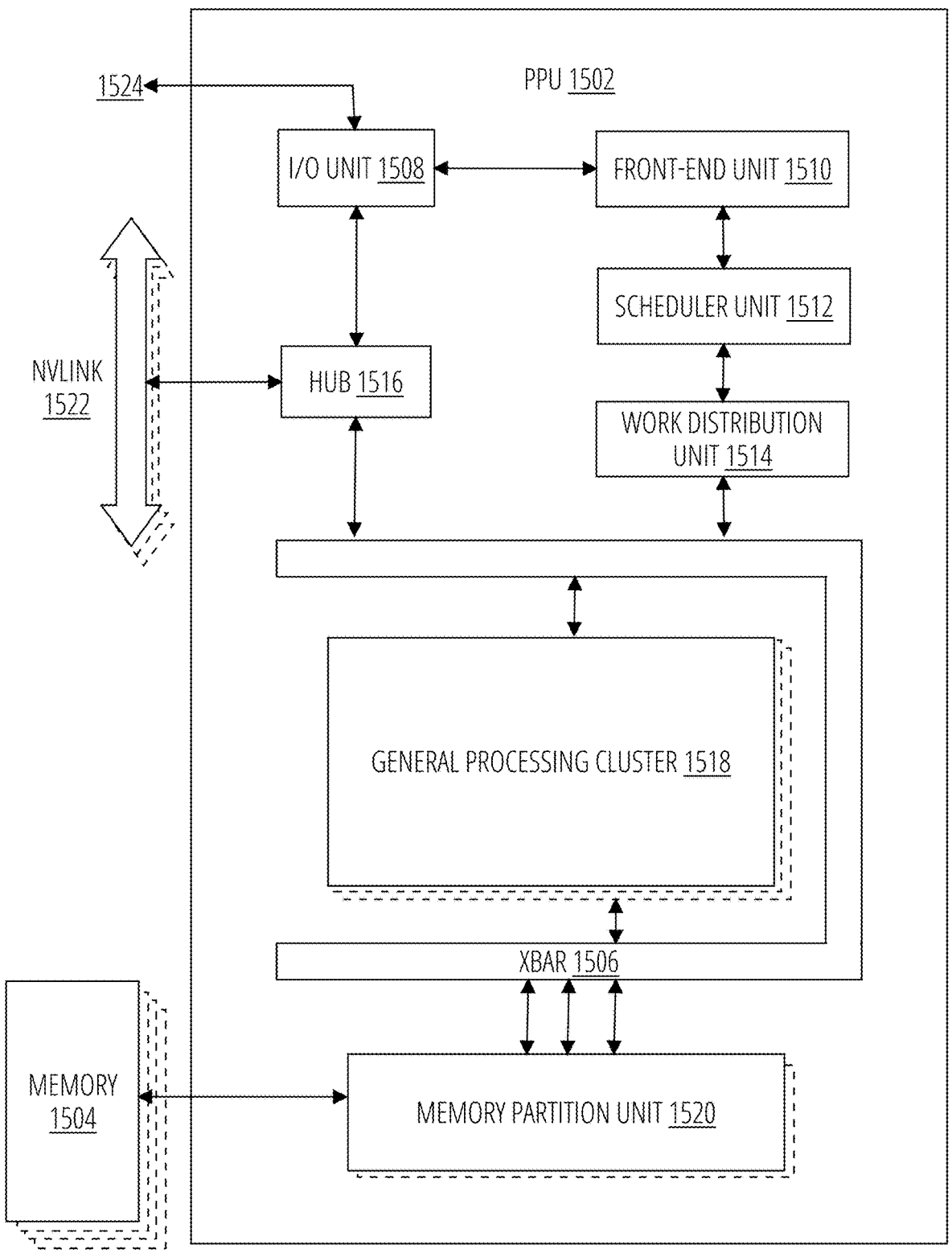
FIG. 15 depicts a parallel processing unit 1502 in accordance with one embodiment.

FIG. 15 depicts a parallel processing unit 1502 in accordance with an embodiment. In an embodiment, the parallel processing unit 1502 is a multi-threaded processor that is implemented on one or more integrated circuit devices. The parallel processing unit 1502 is a latency hiding architecture designed to process many threads in parallel. A thread (e.g., a thread of execution) is an instantiation of a set of instructions configured to be executed by the parallel processing unit 1502. In an embodiment, the parallel processing unit 1502 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1502 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1502 modules may be configured to accelerate thousands of High Performance Computing (HPC), data center, and machine learning applications. The parallel processing unit 1502 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 15, the parallel processing unit 1502 includes an I/O unit 1508, a front-end unit 1510, a scheduler unit 1512, a work distribution unit 1514, a hub 1516, a crossbar 1506, one or more general processing cluster 1518 modules, and one or more memory partition unit 1520 modules. The parallel processing unit 1502 may be coupled to a host processor or other modules via one or more high-speed NVLink 1522 interconnects. The parallel processing unit 1502 may be coupled to a host processor or other peripheral devices via an interconnect 1524. The parallel processing unit 1502 may also be coupled to a local memory comprising a number of memory 1504 devices. In an embodiment, the local memory may comprise a number of dynamic random access memory (DRAM) devices, such as GDDR SGRAM devices. The DRAM devices may be configured as a high-bandwidth memory (HBM) subsystem, with multiple DRAM dies stacked within each device. In one embodiment, the memory 1504 and the parallel processing unit 1502 may communicate using the PAM-3 techniques disclosed herein.

The NVLink 1522 interconnect (which may utilize embodiments of the techniques disclosed herein) enables systems to scale and include one or more parallel processing unit 1502 modules combined with one or more CPUs, supports cache coherence between the parallel processing unit 1502 modules and CPUs, and CPU mastering. Data and/or commands may be transmitted by the NVLink 1522 through the hub 1516 to/from other units of the parallel processing unit 1502 such as one or more copy engines, a video encoder, a video decoder, a power management unit, etc. (not explicitly shown).

The I/O unit 1508 is configured to transmit and receive communications (e.g., commands, data, etc.) from a host processor (not shown) over the interconnect 1524. The I/O unit 1508 may communicate with the host processor directly via the interconnect 1524 or through one or more intermediate devices such as a memory bridge. In an embodiment, the I/O unit 1508 may communicate with one or more other processors, such as one or more parallel processing unit 1502 modules via the interconnect 1524. In an embodiment, the I/O unit 1508 implements a Peripheral Component Interconnect Express (PCIe) interface for communications over a PCIe bus and the interconnect 1524 is a PCIe bus. In alternative embodiments, the I/O unit 1508 may implement other types of well-known interfaces for communicating with external devices.

The I/O unit 1508 decodes packets received via the interconnect 1524. In an embodiment, the packets represent commands configured to cause the parallel processing unit 1502 to perform various operations. The I/O unit 1508 transmits the decoded commands to various other units of the parallel processing unit 1502 as the commands may specify. For example, some commands may be transmitted to the front-end unit 1510. Other commands may be transmitted to the hub 1516 or other units of the parallel processing unit 1502 such as one or more copy engines, a video encoder, a video decoder, a power management unit, etc. (not explicitly shown). In other words, the I/O unit 1508 is configured to route communications between and among the various logical units of the parallel processing unit 1502.

In an embodiment, a program executed by the host processor encodes a command stream in a buffer that provides workloads to the parallel processing unit 1502 for processing. A workload may comprise several instructions and data to be processed by those instructions. The buffer is a region in a memory that is accessible (e.g., read/write) by both the host processor and the parallel processing unit 1502. For example, the I/O unit 1508 may be configured to access the buffer in a system memory connected to the interconnect 1524 via memory requests transmitted over the interconnect 1524. In an embodiment, the host processor writes the command stream to the buffer and then transmits a pointer to the start of the command stream to the parallel processing unit 1502. The front-end unit 1510 receives pointers to one or more command streams. The front-end unit 1510 manages the one or more streams, reading commands from the streams and forwarding commands to the various units of the parallel processing unit 1502.

The front-end unit 1510 is coupled to a scheduler unit 1512 that configures the various general processing cluster 1518 modules to process tasks defined by the one or more streams. The scheduler unit 1512 is configured to track state information related to the various tasks managed by the scheduler unit 1512. The state may indicate which general processing cluster 1518 a task is assigned to, whether the task is active or inactive, a priority level associated with the task, and so forth. The scheduler unit 1512 manages the execution of a plurality of tasks on the one or more general processing cluster 1518 modules.

The scheduler unit 1512 is coupled to a work distribution unit 1514 that is configured to dispatch tasks for execution on the general processing cluster 1518 modules. The work distribution unit 1514 may track a number of scheduled tasks received from the scheduler unit 1512. In an embodiment, the work distribution unit 1514 manages a pending task pool and an active task pool for each of the general processing cluster 1518 modules. The pending task pool may comprise a number of slots (e.g., 32 slots) that contain tasks assigned to be processed by a particular general processing cluster 1518. The active task pool may comprise a number of slots (e.g., 4 slots) for tasks that are actively being processed by the general processing cluster 1518 modules. As a general processing cluster 1518 finishes the execution of a task, that task is evicted from the active task pool for the general processing cluster 1518 and one of the other tasks from the pending task pool is selected and scheduled for execution on the general processing cluster 1518. If an active task has been idle on the general processing cluster 1518, such as while waiting for a data dependency to be resolved, then the active task may be evicted from the general processing cluster 1518 and returned to the pending task pool while another task in the pending task pool is selected and scheduled for execution on the general processing cluster 1518.

The work distribution unit 1514 communicates with the one or more general processing cluster 1518 modules via crossbar 1506. The crossbar 1506 is an interconnect network that couples many of the units of the parallel processing unit 1502 to other units of the parallel processing unit 1502. For example, the crossbar 1506 may be configured to couple the work distribution unit 1514 to a particular general processing cluster 1518. Although not shown explicitly, one or more other units of the parallel processing unit 1502 may also be connected to the crossbar 1506 via the hub 1516.

The tasks are managed by the scheduler unit 1512 and dispatched to a general processing cluster 1518 by the work distribution unit 1514. The general processing cluster 1518 is configured to process the task and generate results. The results may be consumed by other tasks within the general processing cluster 1518, routed to a different general processing cluster 1518 via the crossbar 1506, or stored in the memory 1504. The results can be written to the memory 1504 via the memory partition unit 1520 modules, which implement a memory interface and logic (e.g., PAM-3 encoding logic in accordance with the disclosed techniques) for reading and writing data to/from the memory 1504. The results can be transmitted to another parallel processing unit 1502 or CPU via the NVLink 1522. In an embodiment, the parallel processing unit 1502 includes a number U of memory partition unit 1520 modules that is equal to the number of separate and distinct memory 1504 devices coupled to the parallel processing unit 1502. A memory partition unit 1520 will be described in more detail below in conjunction with FIG. 17.

In an embodiment, a host processor executes a driver kernel that implements an application programming interface (API) that enables one or more applications executing on the host processor to schedule operations for execution on the parallel processing unit 1502. In an embodiment, multiple compute applications are simultaneously executed by the parallel processing unit 1502 and the parallel processing unit 1502 provides isolation, quality of service (QoS), and independent address spaces for the multiple compute applications. An application may generate instructions (e.g., API calls) that cause the driver kernel to generate one or more tasks for execution by the parallel processing unit 1502. The driver kernel outputs tasks to one or more streams being processed by the parallel processing unit 1502. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 18.

Figure 16:
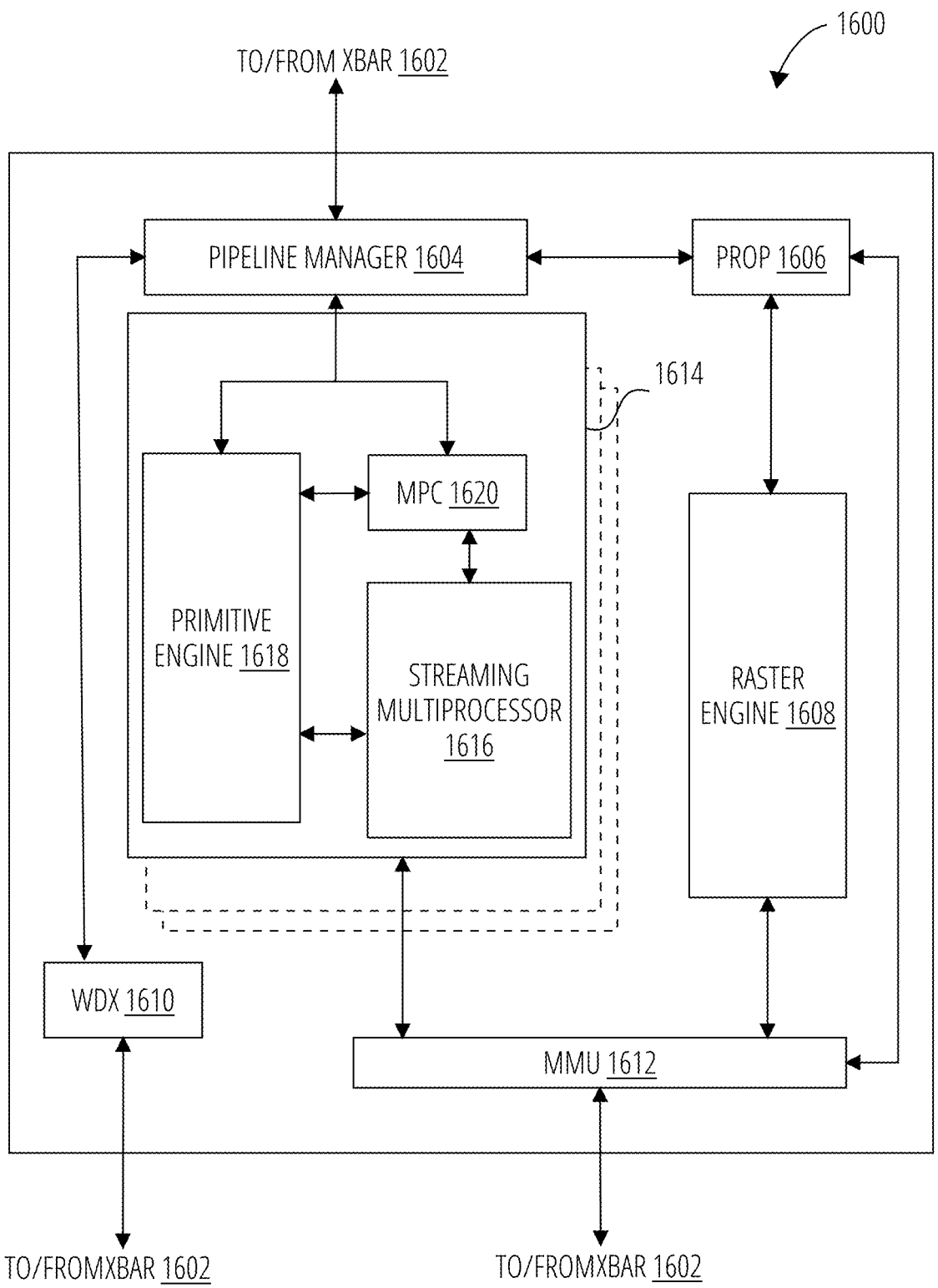
FIG. 16 depicts a general processing cluster 1600 in accordance with one embodiment.

FIG. 16 depicts a general processing cluster 1600 of the parallel processing unit 1502 FIG. 15, in accordance with an embodiment. The general processing cluster 1600 exchanges signals with other system components via a crossbar 1602. As shown in FIG. 16, each general processing cluster 1600 includes a number of hardware units for processing tasks. In an embodiment, each general processing cluster 1600 includes a pipeline manager 1604, a pre-raster operations unit 1606, a raster engine 1608, a work distribution crossbar 1610, a memory management unit 1612, and one or more data processing cluster 1614. It will be appreciated that the general processing cluster 1600 of FIG. 16 may include other hardware units in lieu of or in addition to the units shown in FIG. 16.

In an embodiment, the operation of the general processing cluster 1600 is controlled by the pipeline manager 1604. The pipeline manager 1604 manages the configuration of the one or more data processing cluster 1614 modules for processing tasks allocated to the general processing cluster 1600. In an embodiment, the pipeline manager 1604 may configure at least one of the one or more data processing cluster 1614 modules to implement at least a portion of a graphics rendering pipeline. For example, a data processing cluster 1614 may be configured to execute a vertex shader program on the programmable streaming multiprocessor 1616. The pipeline manager 1604 may also be configured to route packets received from the work distribution unit 1514 to the appropriate logical units within the general processing cluster 1600. For example, some packets may be routed to fixed function hardware units in the pre-raster operations unit 1606 and/or raster engine 1608 while other packets may be routed to the data processing cluster 1614 modules for processing by the primitive engine 1618 or the streaming multiprocessor 1616. In an embodiment, the pipeline manager 1604 may configure at least one of the one or more data processing cluster 1614 modules to implement a neural network model and/or a computing pipeline.

Figure 17:
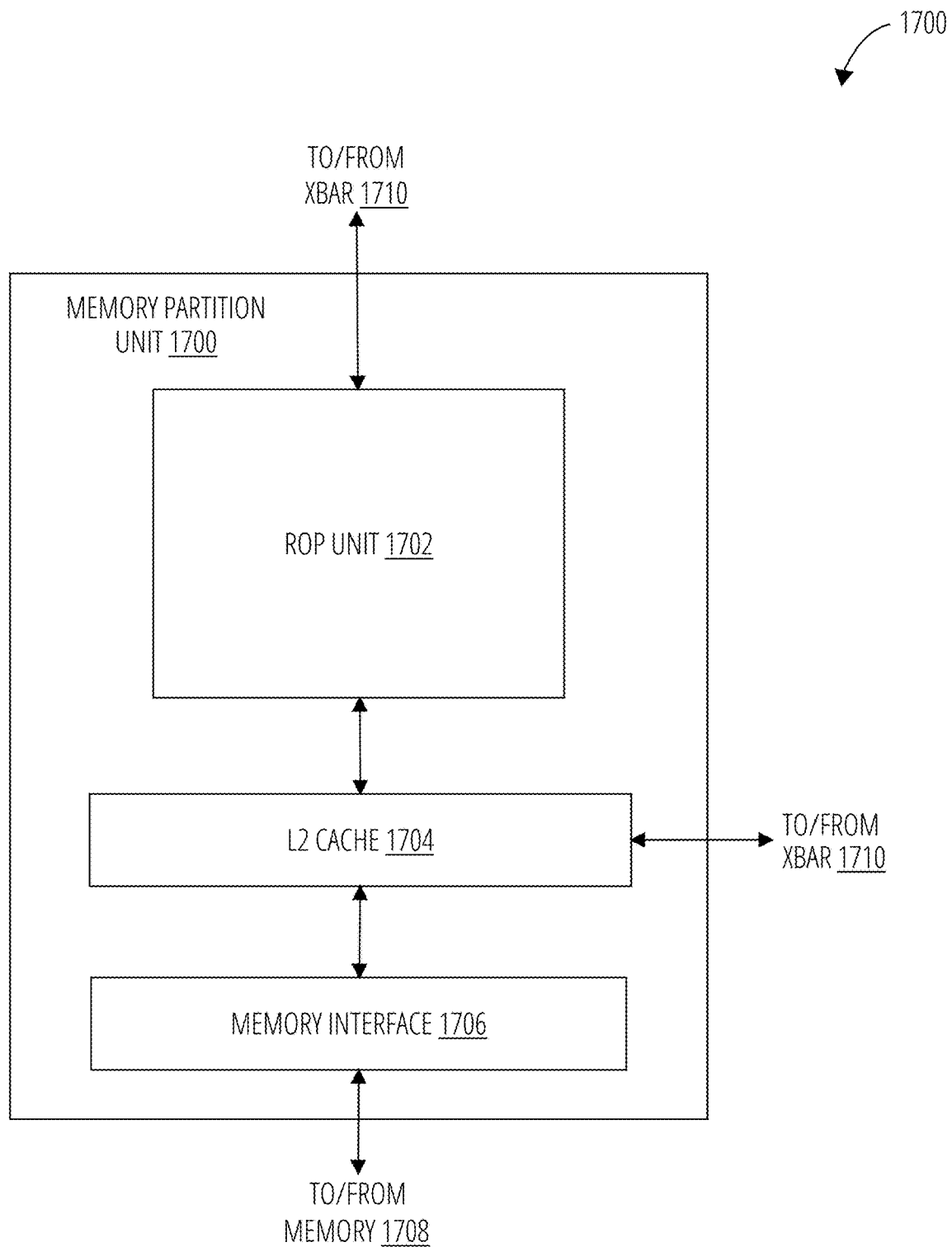
FIG. 17 depicts a memory partition unit 1700 in accordance with one embodiment.

The pre-raster operations unit 1606 is configured to route data generated by the raster engine 1608 and the data processing cluster 1614 modules to a Raster Operations (ROP) unit, described in more detail in conjunction with FIG. 17. The pre-raster operations unit 1606 may also be configured to perform optimizations for color blending, organize pixel data, perform address translations, and the like.

The raster engine 1608 includes a number of fixed function hardware units configured to perform various raster operations. In an embodiment, the raster engine 1608 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1608 comprises fragments to be processed, for example, by a fragment shader implemented within a data processing cluster 1614.

Each data processing cluster 1614 included in the general processing cluster 1600 includes an M-pipe controller 1620, a primitive engine 1618, and one or more streaming multiprocessor 1616 modules. The M-pipe controller 1620 controls the operation of the data processing cluster 1614, routing packets received from the pipeline manager 1604 to the appropriate units in the data processing cluster 1614. For example, packets associated with a vertex may be routed to the primitive engine 1618, which is configured to fetch vertex attributes associated with the vertex from the memory 1504. In contrast, packets associated with a shader program may be transmitted to the streaming multiprocessor 1616.

The streaming multiprocessor 1616 comprises a programmable streaming processor that is configured to process tasks represented by a number of threads. Each streaming multiprocessor 1616 is multi-threaded and configured to execute a plurality of threads (e.g., 32 threads) from a particular group of threads concurrently. In an embodiment, the streaming multiprocessor 1616 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1616 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1616 will be described in more detail below in conjunction with FIG. 18).

The memory management unit 1612 provides an interface between the general processing cluster 1600 and the memory partition unit 1700. The memory management unit 1612 may provide translation of virtual addresses into physical addresses, memory protection, and arbitration of memory requests. In an embodiment, the memory management unit 1612 provides one or more translation lookaside buffers (TLBs) for performing translation of virtual addresses into physical addresses in the memory 1504.

FIG. 17 depicts a memory partition unit 1700 of the parallel processing unit 1502 of FIG. 15, in accordance with an embodiment. As shown in FIG. 17, the memory partition unit 1700 includes a raster operations unit 1702, a level two cache 1704, and a memory interface 1706. The memory interface 1706 is coupled to the memory 1708. Memory interface 1706 may implement 32, 64, 128, 1024-bit data buses, or the like, for high-speed data transfer. The memory interface 1706 may comprise logic to perform PAM-3 encoding/decoding in accordance with the disclosed embodiments. In an embodiment, the parallel processing unit 1502 incorporates U memory interface 1706 modules, one memory interface 1706 per pair of memory partition unit 1700 modules, where each pair of memory partition unit 1700 modules is connected to a corresponding memory 1708 device. For example, parallel processing unit 1502 may be connected to up to Y memory 1708 devices, such as high bandwidth memory stacks or graphics double-data-rate, version 5, synchronous dynamic random access memory, or other types of persistent storage.

In an embodiment, the memory interface 1706 implements an HBM2 memory interface and Y equals half U. In an embodiment, the HBM2 memory stacks are located on the same physical package as the parallel processing unit 1502, providing substantial power and area savings compared with conventional GDDR SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1708 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1502 modules process very large datasets and/or run applications for extended periods.

In an embodiment, the parallel processing unit 1502 implements a multi-level memory hierarchy. In an embodiment, the memory partition unit 1700 supports a unified memory to provide a single unified virtual address space for CPU and parallel processing unit 1502 memory, enabling data sharing between virtual memory systems. In an embodiment the frequency of accesses by a parallel processing unit 1502 to memory located on other processors is traced to ensure that memory pages are moved to the physical memory of the parallel processing unit 1502 that is accessing the pages more frequently. In an embodiment, the NVLink 1522 supports address translation services allowing the 802 to directly access a CPU's page tables and providing full access to CPU memory by the parallel processing unit 1502.

In an embodiment, copy engines transfer data between multiple parallel processing unit 1502 modules or between parallel processing unit 1502 modules and CPUs. The copy engines can generate page faults for addresses that are not mapped into the page tables. The memory partition unit 1700 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1708 or other system memory may be fetched by the memory partition unit 1700 and stored in the level two cache 1704, which is located on-chip and is shared between the various general processing clusters 1600. As shown, each memory partition unit 1700 includes a portion of the level two cache 1704 associated with a corresponding memory 1708 device. Lower level caches may then be implemented in various units within the general processing clusters 1600. For example, each of the streaming multiprocessors 1800 may implement an L1 cache. The L1 cache is private memory that is dedicated to a particular streaming multiprocessor 1800. Data from the level two cache 1704 may be fetched and stored in each of the L1 caches for processing in the functional units of the streaming multiprocessors 1800. The level two cache 1704 is coupled to the memory interface 1706 and the crossbar 1710.

The raster operations unit 1702 performs graphics raster operations related to pixel color, such as color compression, pixel blending, and the like. The raster operations unit 1702 also implements depth testing in conjunction with the raster engine 1608, receiving a depth for a sample location associated with a pixel fragment from the culling engine of the raster engine 1608. The depth is tested against a corresponding depth in a depth buffer for a sample location associated with the fragment. If the fragment passes the depth test for the sample location, then the raster operations unit 1702 updates the depth buffer and transmits a result of the depth test to the raster engine 1608. It will be appreciated that the number of partition memory partition unit 1700 modules may be different than the number of general processing clusters 1600 and, therefore, each raster operations unit 1702 may be coupled to each of the general processing clusters 1600. The raster operations unit 1702 tracks packets received from the different general processing clusters 1600 and determines which general processing cluster 1600 that a result generated by the raster operations unit 1702 is routed to through the crossbar 1710. Although the raster operations unit 1702 is included within the memory partition unit 1700 in FIG. 17, in other embodiment, the raster operations unit 1702 may be outside of the memory partition unit 1700. For example, the raster operations unit 1702 may reside in the general processing cluster 1600 or another unit.

Figure 18:
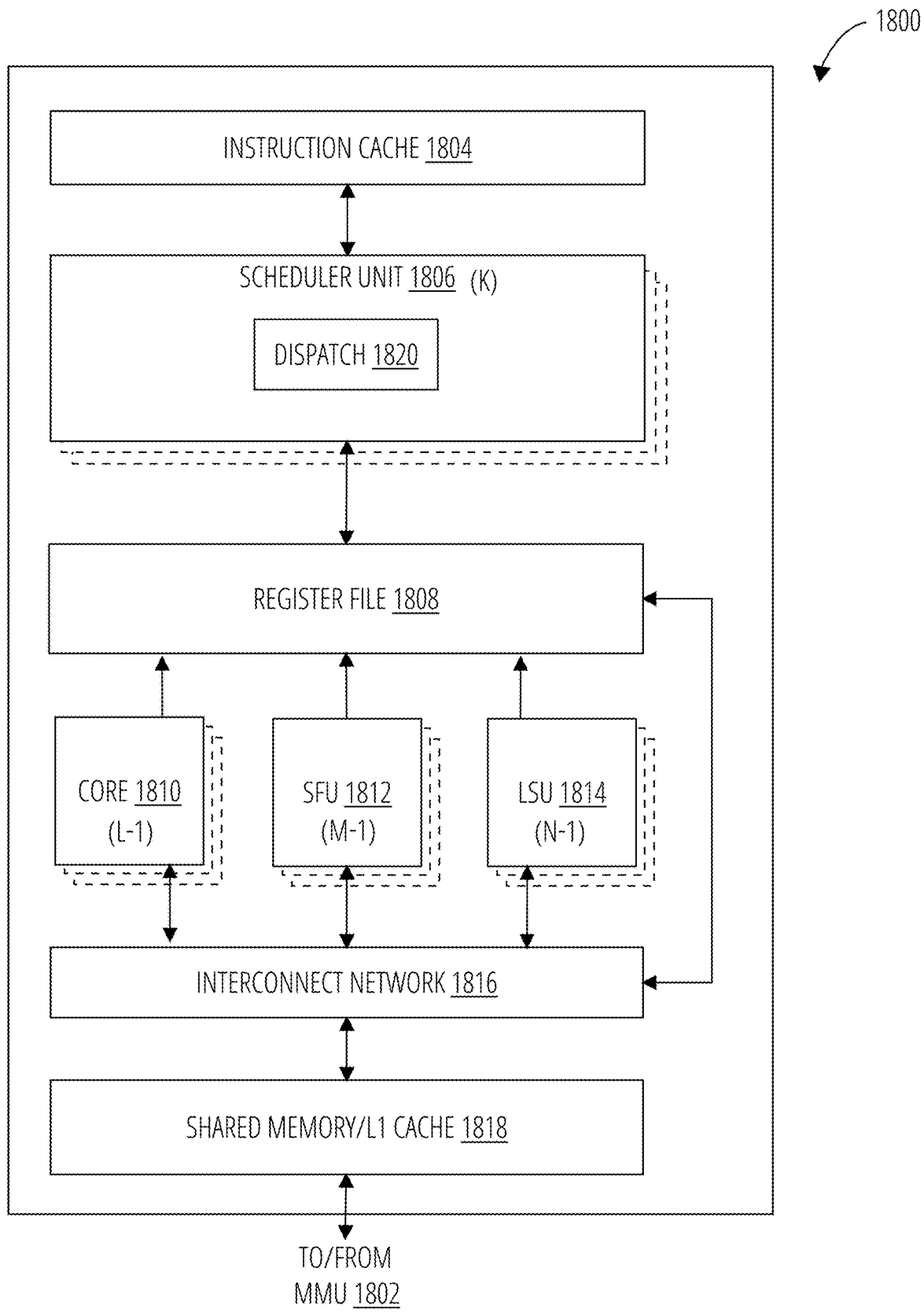
FIG. 18 depicts a streaming multiprocessor 1800 in accordance with one embodiment.

FIG. 18 illustrates the streaming multiprocessor 1800 of FIG. 16, in accordance with an embodiment. The streaming multiprocessor 1800 exchanges signals with a memory management unit 1802. As shown in FIG. 18, the streaming multiprocessor 1800 includes an instruction cache 1804, one or more scheduler unit 1806 modules (e.g., such as scheduler unit 1512), a register file 1808, one or more processing core 1810 modules, one or more special function unit 1812 modules, one or more load/store unit 1814 modules, an interconnect network 1816, and a shared memory/L1 cache 1818.

As described above, the work distribution unit 1514 dispatches tasks for execution on the general processing clusters 1600 of the parallel processing unit 1502. The tasks are allocated to a particular data processing cluster 1614 within a general processing cluster 1600 and, if the task is associated with a shader program, the task may be allocated to a streaming multiprocessor 1800. The scheduler unit 1512 receives the tasks from the work distribution unit 1514 and manages instruction scheduling for one or more thread blocks assigned to the streaming multiprocessor 1800. The scheduler unit 1806 schedules thread blocks for execution as warps of parallel threads, where each thread block is allocated at least one warp. In an embodiment, each warp executes 32 threads. The scheduler unit 1806 may manage a plurality of different thread blocks, allocating the warps to the different thread blocks and then dispatching instructions from the plurality of different cooperative groups to the various functional units (e.g., core 1810 modules, special function unit 1812 modules, and load/store unit 1814 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1820 unit is configured within the scheduler unit 1806 to transmit instructions to one or more of the functional units. In one embodiment, the scheduler unit 1806 includes two dispatch 1820 units that enable two different instructions from the same warp to be dispatched during each clock cycle. In alternative embodiments, each scheduler unit 1806 may include a single dispatch 1820 unit or additional dispatch 1820 units.

Each streaming multiprocessor 1800 includes a register file 1808 that provides a set of registers for the functional units of the streaming multiprocessor 1800. In an embodiment, the register file 1808 is divided between each of the functional units such that each functional unit is allocated a dedicated portion of the register file 1808. In another embodiment, the register file 1808 is divided between the different warps being executed by the streaming multiprocessor 1800. The register file 1808 provides temporary storage for operands connected to the data paths of the functional units.

Each streaming multiprocessor 1800 comprises L processing core 1810 modules. In an embodiment, the streaming multiprocessor 1800 includes a large number (e.g., 128, etc.) of distinct processing core 1810 modules. Each core 1810 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1810 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1810 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A'B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1800 also comprises M special function unit 1812 modules that perform special functions (e.g., attribute evaluation, reciprocal square root, and the like). In an embodiment, the special function unit 1812 modules may include a tree traversal unit configured to traverse a hierarchical tree data structure. In an embodiment, the special function unit 1812 modules may include texture unit configured to perform texture map filtering operations. In an embodiment, the texture units are configured to load texture maps (e.g., a 2D array of texels) from the memory 1504 and sample the texture maps to produce sampled texture values for use in shader programs executed by the streaming multiprocessor 1800. In an embodiment, the texture maps are stored in the shared memory/L1 cache 1818. The texture units implement texture operations such as filtering operations using mip-maps (e.g., texture maps of varying levels of detail). In an embodiment, each streaming multiprocessor 1800 includes two texture units.

Each streaming multiprocessor 1800 also comprises N load/store unit 1814 modules that implement load and store operations between the shared memory/L1 cache 1818 and the register file 1808. Each streaming multiprocessor 1800 includes an interconnect network 1816 that connects each of the functional units to the register file 1808 and the load/store unit 1814 to the register file 1808 and shared memory/L1 cache 1818. In an embodiment, the interconnect network 1816 is a crossbar that can be configured to connect any of the functional units to any of the registers in the register file 1808 and connect the load/store unit 1814 modules to the register file 1808 and memory locations in shared memory/L1 cache 1818.

The shared memory/L1 cache 1818 is an array of on-chip memory that allows for data storage and communication between the streaming multiprocessor 1800 and the primitive engine 1618 and between threads in the streaming multiprocessor 1800. In an embodiment, the shared memory/L1 cache 1818 comprises 128 KB of storage capacity and is in the path from the streaming multiprocessor 1800 to the memory partition unit 1700. The shared memory/L1 cache 1818 can be used to cache reads and writes. One or more of the shared memory/L1 cache 1818, level two cache 1704, and memory 1504 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1818 enables the shared memory/L1 cache 1818 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 15, are bypassed, creating a much simpler programming model. In the general purpose parallel computation configuration, the work distribution unit 1514 assigns and distributes blocks of threads directly to the data processing cluster 1614 modules. The threads in a block execute the same program, using a unique thread ID in the calculation to ensure each thread generates unique results, using the streaming multiprocessor 1800 to execute the program and perform calculations, shared memory/L1 cache 1818 to communicate between threads, and the load/store unit 1814 to read and write global memory through the shared memory/L1 cache 1818 and the memory partition unit 1700. When configured for general purpose parallel computation, the streaming multiprocessor 1800 can also write commands that the scheduler unit 1512 can use to launch new work on the data processing clusters 1614.

The parallel processing unit 1502 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1502 is embodied on a single semiconductor substrate. In another embodiment, the parallel processing unit 1502 is included in a system-on-a-chip (SoC) along with one or more other devices such as additional parallel processing units 1502, the memory 1504, a reduced instruction set computer (RISC) CPU, a memory management unit (MMU), a digital-to-analog converter (DAC), and the like.

In an embodiment, the parallel processing unit 1502 may be included on a graphics card that includes one or more memory devices. The graphics card may be configured to interface with a PCIe slot on a motherboard of a desktop computer. In yet another embodiment, the parallel processing unit 1502 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 19:
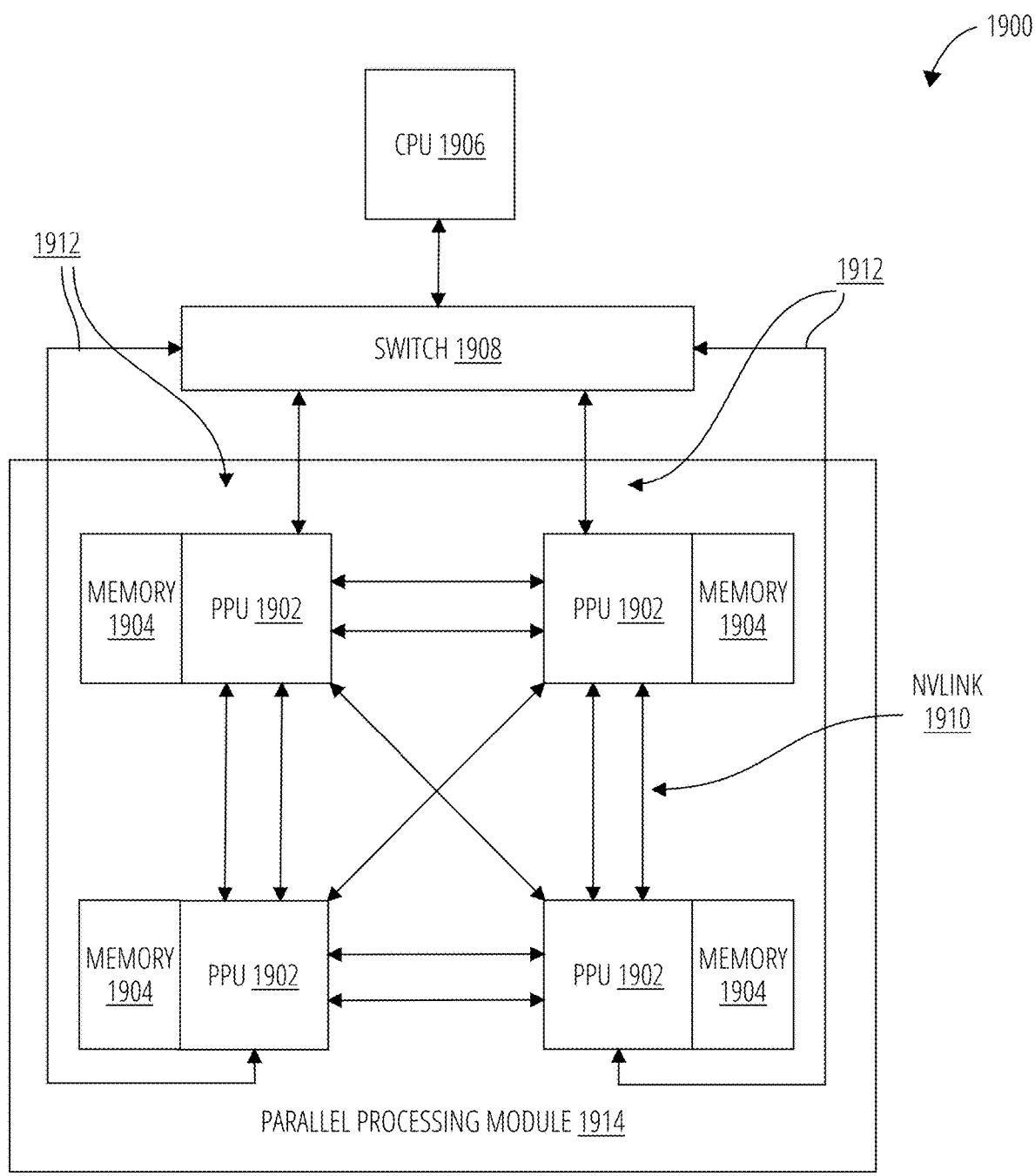
FIG. 19 depicts a processing system 1900 in accordance with one embodiment.

FIG. 19 is a conceptual diagram of a processing system 1900 implemented using the parallel processing unit 1902 of FIG. 15, in accordance with an embodiment. The processing system 1900 includes a central processing unit 1906, switch 1908, and multiple parallel processing unit 1902 modules each and respective memory 1904 modules. The NVLink 1910 provides high-speed communication links between each of the parallel processing unit 1902 modules. Although a particular number of NVLink 1910 and interconnect 1912 connections are illustrated in FIG. 19, the number of connections to each parallel processing unit 1902 and the central processing unit 1906 may vary. The switch 1908 interfaces between the interconnect 1912 and the central processing unit 1906. The parallel processing unit 1902 modules, memory 1904 modules, and NVLink 1910 connections may be situated on a single semiconductor platform to form a parallel processing module 1914. In an embodiment, the switch 1908 supports two or more protocols to interface between various different connections and/or links.

In another embodiment (not shown), the NVLink 1910 provides one or more high-speed communication links between each of the parallel processing unit modules (parallel processing unit 1902, parallel processing unit 1902, parallel processing unit 1902, and parallel processing unit 1902) and the central processing unit 1906 and the switch 1908 interfaces between the interconnect 1912 and each of the parallel processing unit modules. The parallel processing unit modules, memory 1904 modules, and interconnect 1912 may be situated on a single semiconductor platform to form a parallel processing module 1914. In yet another embodiment (not shown), the interconnect 1912 provides one or more communication links between each of the parallel processing unit modules and the central processing unit 1906 and the switch 1908 interfaces between each of the parallel processing unit modules using the NVLink 1910 to provide one or more high-speed communication links between the parallel processing unit modules. In another embodiment (not shown), the NVLink 1910 provides one or more high-speed communication links between the parallel processing unit modules and the central processing unit 1906 through the switch 1908. In yet another embodiment (not shown), the interconnect 1912 provides one or more communication links between each of the parallel processing unit modules directly. One or more of the NVLink 1910 high-speed communication links may be implemented as a physical NVLink interconnect or either an on-chip or on-die interconnect using the same protocol as the NVLink 1910.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1914 may be implemented as a circuit board substrate and each of the parallel processing unit modules and/or memory 1904 modules may be packaged devices. In an embodiment, the central processing unit 1906, switch 1908, and the parallel processing module 1914 are situated on a single semiconductor platform.

In an embodiment, the signaling rate of each NVLink 1910 is 20 to 25 Gigabits/second and each parallel processing unit module includes six NVLink 1910 interfaces (as shown in FIG. 19, five NVLink 1910 interfaces are included for each parallel processing unit module). Each NVLink 1910 provides a data transfer rate of 25 Gigabytes/second in each direction, with six links providing 300 Gigabytes/second. The NVLink 1910 can be used exclusively for PPU-to-PPU communication as shown in FIG. 19, or some combination of PPU-to-PPU and PPU-to-CPU, when the central processing unit 1906 also includes one or more NVLink 1910 interfaces.

In an embodiment, the NVLink 1910 allows direct load/store/atomic access from the central processing unit 1906 to each parallel processing unit module's memory 1904. In an embodiment, the NVLink 1910 supports coherency operations, allowing data read from the memory 1904 modules to be stored in the cache hierarchy of the central processing unit 1906, reducing cache access latency for the central processing unit 1906. In an embodiment, the NVLink 1910 includes support for Address Translation Services (ATS), enabling the parallel processing unit module to directly access page tables within the central processing unit 1906. One or more of the NVLink 1910 may also be configured to operate in a low-power mode.

Graphics Processing Pipeline

Figure 20:
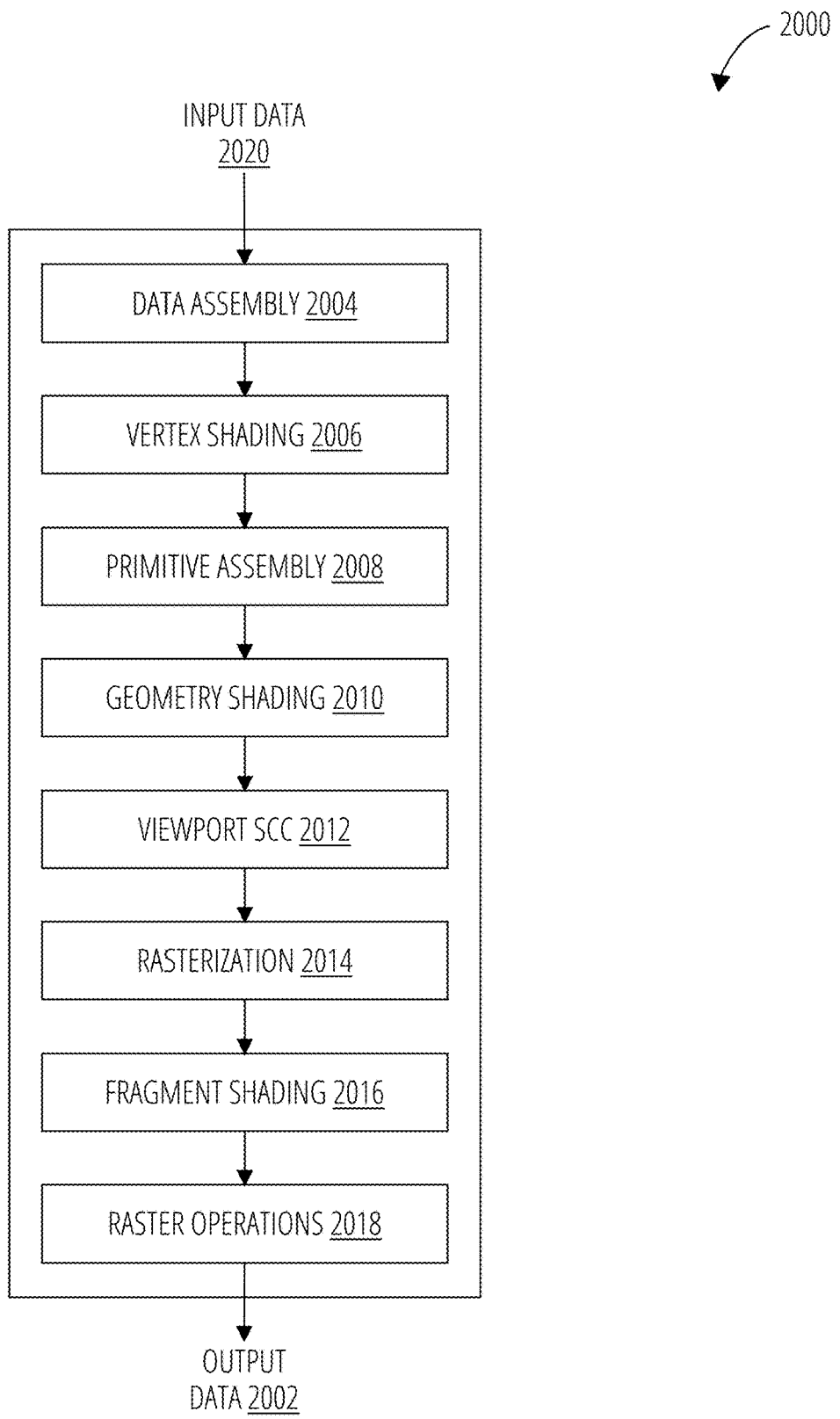
FIG. 20 depicts a graphics processing pipeline 2000 in accordance with one embodiment.

FIG. 20 is a conceptual diagram of a graphics processing pipeline 2000 implemented by the parallel processing unit 1502 of FIG. 15, in accordance with an embodiment. In an embodiment, the parallel processing unit 1502 comprises a graphics processing unit (GPU). The parallel processing unit 1502 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1502 may be configured to process the graphics primitives to generate a frame buffer (e.g., pixel data for each of the pixels of the display).

An application writes model data for a scene (e.g., a collection of vertices and attributes) to a memory such as a system memory or memory 1504. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessors 1800 of the parallel processing unit 1502 including one or more of a vertex shader, hull shader, domain shader, geometry shader, and a pixel shader. For example, one or more of the streaming multiprocessor 1800 modules may be configured to execute a vertex shader program that processes a number of vertices defined by the model data. In an embodiment, the different streaming multiprocessor 1800 modules may be configured to execute different shader programs concurrently. For example, a first subset of streaming multiprocessors 1616 may be configured to execute a vertex shader program while a second subset of streaming multiprocessors 1616 may be configured to execute a pixel shader program. The first subset of streaming multiprocessors 1616 processes vertex data to produce processed vertex data and writes the processed vertex data to the level two cache 1704 and/or the memory 1504. After the processed vertex data is rasterized (e.g., transformed from three-dimensional data into two-dimensional data in screen space) to produce fragment data, the second subset of streaming multiprocessors 1800 modules executes a pixel shader to produce processed fragment data, which is then blended with other processed fragment data and written to the frame buffer in memory 1504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 2000 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 2000 receives input data 601 that is transmitted from one stage to the next stage of the graphics processing pipeline 2000 to generate output data 2002. In an embodiment, the graphics processing pipeline 2000 may represent a graphics processing pipeline defined by the OpenGL® API. As an option, the graphics processing pipeline 2000 may be implemented in the context of the functionality and architecture of the previous Figures and/or any subsequent Figure(s).

As shown in FIG. 20, the graphics processing pipeline 2000 comprises a pipeline architecture that includes a number of stages. The stages include, but are not limited to, a data assembly 2004 stage, a vertex shading 2006 stage, a primitive assembly 2008 stage, a geometry shading 2010 stage, a viewport SCC 2012 stage, a rasterization 2014 stage, a fragment shading 2016 stage, and a raster operations 2018 stage. In an embodiment, the input data 2020 comprises commands that configure the processing units to implement the stages of the graphics processing pipeline 2000 and geometric primitives (e.g., points, lines, triangles, quads, triangle strips or fans, etc.) to be processed by the stages. The output data 2002 may comprise pixel data (e.g., color data) that is copied into a frame buffer or other type of surface data structure in a memory.

The data assembly 2004 stage receives the input data 2020 that specifies vertex data for high-order surfaces, primitives, or the like. The data assembly 2004 stage collects the vertex data in a temporary storage or queue, such as by receiving a command from the host processor that includes a pointer to a buffer in memory and reading the vertex data from the buffer. The vertex data is then transmitted to the vertex shading 2006 stage for processing.

The vertex shading 2006 stage processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shading 2006 stage may manipulate individual vertex attributes such as position, color, texture coordinates, and the like. In other words, the vertex shading 2006 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 2006 stage generates transformed vertex data that is transmitted to the primitive assembly 2008 stage.

The primitive assembly 2008 stage collects vertices output by the vertex shading 2006 stage and groups the vertices into geometric primitives for processing by the geometry shading 2010 stage. For example, the primitive assembly 2008 stage may be configured to group every three consecutive vertices as a geometric primitive (e.g., a triangle) for transmission to the geometry shading 2010 stage. In some embodiments, specific vertices may be reused for consecutive geometric primitives (e.g., two consecutive triangles in a triangle strip may share two vertices). The primitive assembly 2008 stage transmits geometric primitives (e.g., a collection of associated vertices) to the geometry shading 2010 stage.

The geometry shading 2010 stage processes geometric primitives by performing a set of operations (e.g., a geometry shader or program) on the geometric primitives. Tessellation operations may generate one or more geometric primitives from each geometric primitive. In other words, the geometry shading 2010 stage may subdivide each geometric primitive into a finer mesh of two or more geometric primitives for processing by the rest of the graphics processing pipeline 2000. The geometry shading 2010 stage transmits geometric primitives to the viewport SCC 2012 stage.

In an embodiment, the graphics processing pipeline 2000 may operate within a streaming multiprocessor and the vertex shading 2006 stage, the primitive assembly 2008 stage, the geometry shading 2010 stage, the fragment shading 2016 stage, and/or hardware/software associated therewith, may sequentially perform processing operations. Once the sequential processing operations are complete, in an embodiment, the viewport SCC 2012 stage may utilize the data. In an embodiment, primitive data processed by one or more of the stages in the graphics processing pipeline 2000 may be written to a cache (e.g. L1 cache, a vertex cache, etc.). In this case, in an embodiment, the viewport SCC 2012 stage may access the data in the cache. In an embodiment, the viewport SCC 2012 stage and the rasterization 2014 stage are implemented as fixed function circuitry.

The viewport SCC 2012 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 2014 stage.

The rasterization 2014 stage converts the 3D geometric primitives into 2D fragments (e.g. capable of being utilized for display, etc.). The rasterization 2014 stage may be configured to utilize the vertices of the geometric primitives to setup a set of plane equations from which various attributes can be interpolated. The rasterization 2014 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 2014 stage generates fragment data (e.g., interpolated vertex attributes associated with a particular sample location for each covered pixel) that are transmitted to the fragment shading 2016 stage.

The fragment shading 2016 stage processes fragment data by performing a set of operations (e.g., a fragment shader or a program) on each of the fragments. The fragment shading 2016 stage may generate pixel data (e.g., color values) for the fragment such as by performing lighting operations or sampling texture maps using interpolated texture coordinates for the fragment. The fragment shading 2016 stage generates pixel data that is transmitted to the raster operations 2018 stage.

The raster operations 2018 stage may perform various operations on the pixel data such as performing alpha tests, stencil tests, and blending the pixel data with other pixel data corresponding to other fragments associated with the pixel. When the raster operations 2018 stage has finished processing the pixel data (e.g., the output data 2002), the pixel data may be written to a render target such as a frame buffer, a color buffer, or the like.

It will be appreciated that one or more additional stages may be included in the graphics processing pipeline 2000 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 2010 stage). Other types of graphics processing pipelines are contemplated as being within the scope of the present disclosure. Furthermore, any of the stages of the graphics processing pipeline 2000 may be implemented by one or more dedicated hardware units within a graphics processor such as parallel processing unit 1502. Other stages of the graphics processing pipeline 2000 may be implemented by programmable hardware units such as the streaming multiprocessors 1616 of the parallel processing unit 1502.

The graphics processing pipeline 2000 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1502. The API provides an abstraction for a programmer that lets a programmer utilize specialized graphics hardware, such as the parallel processing unit 1502, to generate the graphical data without requiring the programmer to utilize the specific instruction set for the parallel processing unit 1502. The application may include an API call that is routed to the device driver for the parallel processing unit 1502. The device driver interprets the API call and performs various operations to respond to the API call. In some instances, the device driver may perform operations by executing instructions on the CPU. In other instances, the device driver may perform operations, at least in part, by launching operations on the parallel processing unit 1502 utilizing an input/output interface between the CPU and the parallel processing unit 1502. In an embodiment, the device driver is configured to implement the graphics processing pipeline 2000 utilizing the hardware of the parallel processing unit 1502.

Various programs may be executed within the parallel processing unit 1502 in order to implement the various stages of the graphics processing pipeline 2000. For example, the device driver may launch a kernel on the parallel processing unit 1502 to perform the vertex shading 2006 stage on one streaming multiprocessor 1800 (or multiple streaming multiprocessors 1800). The device driver (or the initial kernel executed by the parallel processing unit 1502) may also launch other kernels on the parallel processing unit 1502 to perform other stages of the graphics processing pipeline 2000, such as the geometry shading 2010 stage and the fragment shading 2016 stage. In addition, some of the stages of the graphics processing pipeline 2000 may be implemented on fixed unit hardware such as a rasterizer or a data assembler implemented within the parallel processing unit 1502. It will be appreciated that results from one kernel may be processed by one or more intervening fixed function hardware units before being processed by a subsequent kernel on a streaming multiprocessor 1800.

Machine Embodiments

Figure 21:
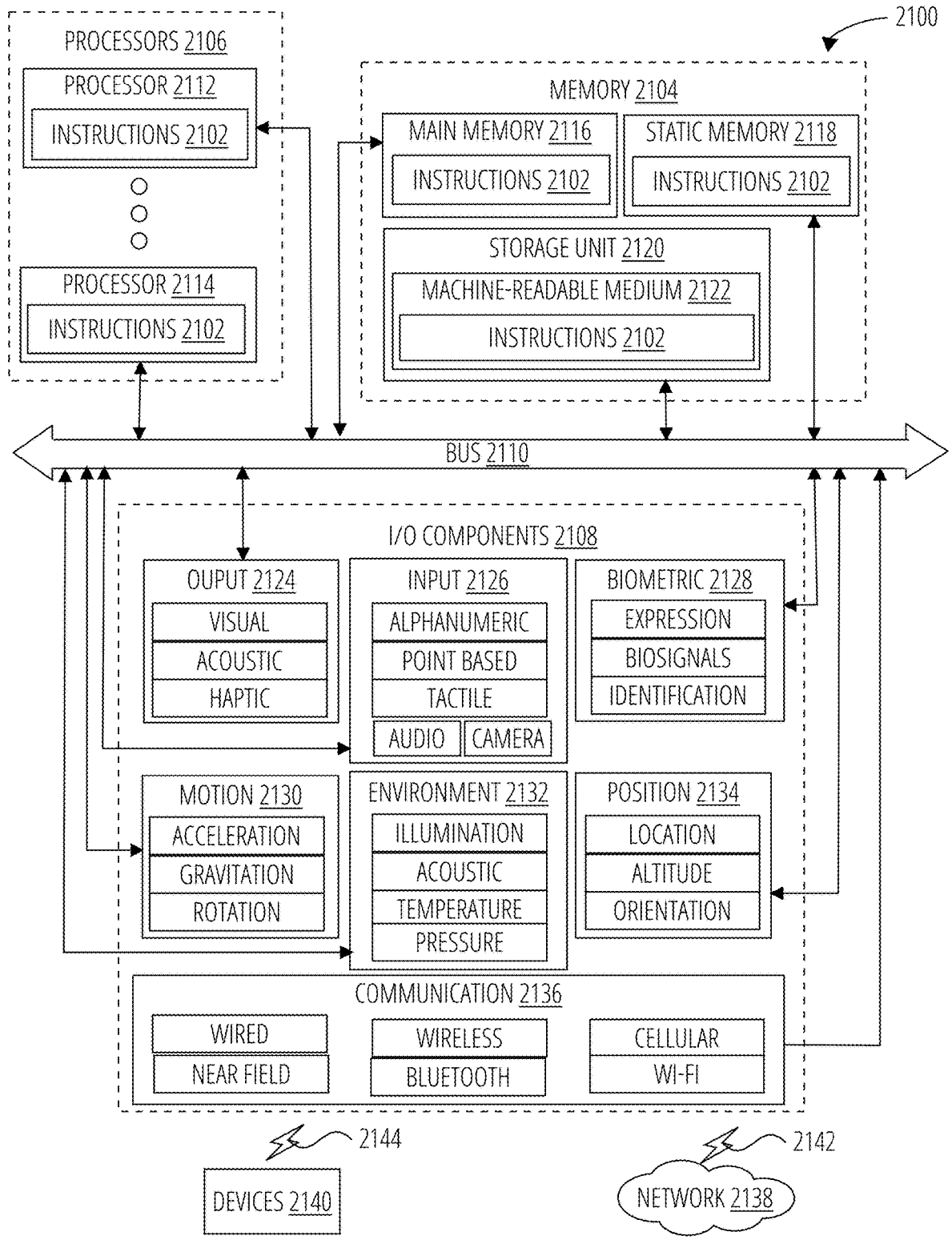
FIG. 21 depicts a machine 2100 in the form of a computer system within which a set of instructions may be executed for causing the machine to perform any one or more of the methodologies discussed herein, according to an example embodiment.

FIG. 21 depicts a diagrammatic representation of a machine 2100 in the form of a computer system within which logic may be implemented to cause the machine to perform any one or more of the functions or methods disclosed herein, according to an example embodiment.

Specifically, FIG. 21 depicts a machine 2100 comprising instructions 2102 (e.g., a program, an application, an applet, an app, or other executable code) for causing the machine 2100 to execute various functions. The instructions 2102 configure a general, non-programmed machine into a particular machine 2100 programmed to carry out said functions and/or methods.

The machine 2100 includes various components (e.g., memories 2104, processors 2106) that may exchange data and/or commands in accordance with the techniques described herein.

In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2102, sequentially or otherwise, that specify actions to be taken by the machine 2100. Further, while only a single machine 2100 is depicted, the term "machine" shall also be taken to include a collection of machines that individually or jointly execute the instructions 2102 to perform any one or more of the methodologies or subsets thereof discussed herein.

The machine 2100 may include processors 2106, memory 2104, and I/O components 2108, which may be configured to communicate with each other such as via one or more bus 2110. In an example embodiment, the processors 2106 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 2112 and processor 2114) to execute the instructions 2102. The term "processor" is intended to include multi-core processors that may comprise two or more independent processors (sometimes referred to as "cores") that may execute instructions contemporaneously. Although FIG. 21 depicts multiple processors 2106, the machine 2100 may include a single processor with a single core, a single processor with multiple cores (e.g., a multi-core processor), multiple processors with a single core, multiple processors with multiples cores, or any combination thereof.

The memory 2104 may include one or more of a main memory 2116, a static memory 2118, and a storage unit 2120, each accessible to the processors 2106 such as via the bus 2110. The main memory 2116, the static memory 2118, and storage unit 2120 may be utilized, individually or in combination, to store the instructions 2102 embodying any one or more of the functionality described herein. The instructions 2102 may reside, completely or partially, within the main memory 2116, within the static memory 2118, within a machine-readable medium 2122 within the storage unit 2120, within at least one of the processors 2106 (e.g., within the processor's cache memory), or any suitable combination thereof, during execution thereof by the machine 2100.

The I/O components 2108 may include a wide variety of components to receive input, provide output, produce output, transmit information, exchange information, capture measurements, and so on. The specific I/O components 2108 that are included in a particular machine will depend on the type of machine. For example, portable machines such as mobile phones will likely include a touch input device or other such input mechanisms, while a headless server machine will likely not include such a touch input device. It will be appreciated that the I/O components 2108 may include many other components that are not shown in FIG. 21. The I/O components 2108 are grouped according to functionality merely for simplifying the following discussion and the grouping is in no way limiting. In various example embodiments, the I/O components 2108 may include output components 2124 and input components 2126. The output components 2124 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 2108 may include biometric components 2128, motion components 2130, environmental components 2132, or position components 2134, among a wide array of possibilities. For example, the biometric components 2128 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 2130 may include acceleration sensor components (e.g., accelerometer), gravitation sensor components, rotation sensor components (e.g., gyroscope), and so forth. The environmental components 2132 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2134 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2108 may include communication components 2136 operable to couple the machine 2100 to a network 2138 or devices 2140 via a coupling 2142 and a coupling 2144, respectively. For example, the communication components 2136 may include a network interface component or another suitable device to interface with the network 2138. In further examples, the communication components 2136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2140 may be another machine or any of a wide variety of peripheral devices (e.g., a peripheral device coupled via a USB).

Moreover, the communication components 2136 may detect identifiers or include components operable to detect identifiers. For example, the communication components 2136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2136, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 2104, main memory 2116, static memory 2118, and/or memory of the processors 2106) and/or storage unit 2120 may store one or more sets of instructions and data structures (e.g., software) embodying or utilized by any one or more of the methodologies or functions described herein. These instructions (e.g., the instructions 2102), when executed by processors 2106, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

Communication Network Embodiments

In various example embodiments, one or more portions of the network 2138 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2138 or a portion of the network 2138 may include a wireless or cellular network, and the coupling 2142 may be a Code Division Multiple Access (CDMA) connection, a Global System for Mobile communications (GSM) connection, or another type of cellular or wireless coupling. In this example, the coupling 2142 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2102 and/or data generated by or received and processed by the instructions 2102 may be transmitted or received over the network 2138 using a transmission medium via a network interface device (e.g., a network interface component included in the communication components 2136) and utilizing any one of a number of well-known transfer protocols (e.g., hypertext transfer protocol (HTTP)). Similarly, the instructions 2102 may be transmitted or received using a transmission medium via the coupling 2144 (e.g., a peer-to-peer coupling) to the devices 2140. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2102 for execution by the machine 2100, and/or data generated by execution of the instructions 2102, and/or data to be operated on during execution of the instructions 2102, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Figure 22:
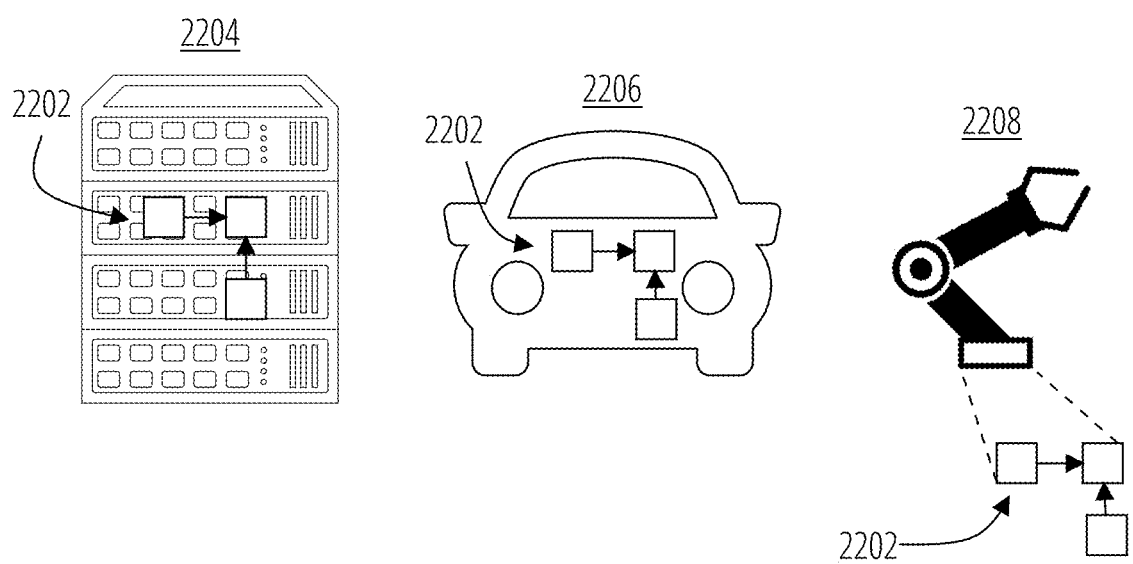
FIG. 22 depicts a circuit system 2202 in accordance with one embodiment.

FIG. 22 depicts exemplary scenarios for use of a circuit system 2202 in accordance with some embodiments. A circuit system 2202 may be utilized in a computing system 2204 (e.g., a data center computer or computers), a vehicle 2206, and a robot 2208, to name just a few examples. The circuit system 2202 may comprise a PAM-3 transmitter communicating data and/or instructions to a receiver, for example over a memory bus.

LISTING OF DRAWING ELEMENTS

100 data communication system
102 data processor
104 processing core
106 PAM-3 symbol encoder
108 PAM-3 transmitter
110 memory
112 memory bus
114 PAM-3 receiver
116 PAM-3 symbol decoder
118 internal data bus
200 PAM-3 transceiver
202 least significant bit transmitter
204 most significant bit transmitter
206 receiver
208 data lane
302 transmitter
304 receiver
400 burst read system
402 data burst
404 DQ/DQX/DQY encoder
406 EDC encoder
408 PAM-3 encoding
410 PAM-3 encoding
500 machine memory system
502 CRC checker
504 DRAM
506 DQE decoder
508 CRC generator
510 DQE encoder
800 logic
1302 memory cells
1304 driver
1306 11b7s encoder
1308 3b2s encoder
1310 3b2s gray encoder
1312 poison/severity encoder
1314 2s3b gray decoder
1316 7s11b decoder
1318 2s3b decoder

| | |
|---|---|
| 1320 poison/severity decoder | 1904 memory |
| 1402 memory controller | 1906 central processing unit |
| 1502 parallel processing unit | 1908 switch |
| 1504 memory | 1910 NVLink |
| 1506 crossbar | 1912 interconnect |
| 1508 I/O unit | 1914 parallel processing module |
| 1510 front-end unit | 2000 graphics processing pipeline |
| 1512 scheduler unit | 2002 output data |
| 1514 work distribution unit | 2004 data assembly |
| 1516 hub | 2006 vertex shading |
| 1518 general processing cluster | 2008 primitive assembly |
| 1520 memory partition unit | 2010 geometry shading |
| 1522 NVLink | 2012 viewport SCC |
| 1524 interconnect | 2014 rasterization |
| 1600 general processing cluster | 2016 fragment shading |
| 1602 crossbar | 2018 raster operations |
| 1604 pipeline manager | 2020 input data |
| 1606 pre-raster operations unit | 2100 machine |
| 1608 raster engine | 2102 instructions |
| 1610 work distribution crossbar | 2104 memory |
| 1612 memory management unit | 2106 processors |
| 1614 data processing cluster | 2108 I/O components |
| 1616 streaming multiprocessor | 2110 bus |
| 1618 primitive engine | 2112 processor |
| 1620 M-pipe controller | 2114 processor |
| 1700 memory partition unit | 2116 main memory |
| 1702 raster operations unit | 2118 static memory |
| 1704 level two cache | 2120 storage unit |
| 1706 memory interface | 2122 machine-readable medium |
| 1708 memory | 2124 output components |
| 1710 crossbar | 2126 input components |
| 1800 streaming multiprocessor | 2128 biometric components |
| 1802 memory management unit | 2130 motion components |
| 1804 instruction cache | 2132 environmental components |
| 1806 scheduler unit | 2134 position components |
| 1808 register file | 2136 communication components |
| 1810 core | 2138 network |
| 1812 special function unit | 2140 devices |
| 1814 load/store unit | 2142 coupling |
| 1816 interconnect network | 2144 coupling |
| 1818 shared memory/L1 cache | 2202 circuit system |
| 1820 dispatch | 2204 computing system |
| 1900 processing system | 2206 vehicle |
| 1902 parallel processing unit | 2208 robot |

LISTING I

```
// ENCODER ALGORITHM
module pam3enc_srs_v2 ( input logic [10:0] x, output logic [13:0] y );
logic [4:0] s;
logic [13:0] mask;
reg [13:0] y_loc;
logic [9:0] lmask;
reg [3:0] sum;
always_comb begin
    // default mask for the easy to encode types
    //mask = {4'b0000,8'b00000000,1'b0,x[10]};
    // flags to determine invalid 2'b10 symbols
    s[4]=(2'b10 == x[9:8]);
    s[3]=(2'b10 == x[7:6]);
    s[2]=(2'b10 == x[5:4]);
    s[1]=(2'b10 == x[3:2]);
    s[0]=(2'b10 == x[1:0]);
    sum = s[0]+s[1]+s[2]+s[3]+s[4];
    // set bits that have invalid symbols to 2'b00
    y_loc[1:0] = s[0] ? 2'b00 : x[1:0];
    y_loc[3:2] = s[1] ? 2'b00 : x[3:2];
    y_loc[5:4] = s[2] ? 2'b00 : x[5:4];
```

LISTING I

```
        y_loc[7:6] = s[3] ? 2'b00 : x[7:6];
        y_loc[9:8] = s[4] ? 2'b00 : x[9:8];
        y_loc[13:10] = 4'b0000;
// outlier case
        if(s == 5'b00101) // need to shift bits
            y_loc = {y_loc[13:10],y_loc[9:8],y_loc[5:4],y_loc[7:6],y_loc[3:0]};
        unique case(sum)
            3'b000 : lmask = 10'b00000000;
            3'b001 : lmask = {8'b00000000, 1'b0,x[10]};
            3'b010 : lmask = {6'b000000,1'b0,x[10],2'b11};
            3'b011 : lmask = {4'b0000,1'b0,x[10],4'b1111};
            3'b100 : lmask = {2'b00, 1'b0,x[10],6'b111111};
            3'b101 : lmask = {1'b0,x[10],8'b11111111};
        endcase
        if(sum == 0) mask= {3'b000,x[10],lmask};
        if((s[0] & ~s[4]) | sum == 5) mask = {4'b0011, lmask};
        if(s[1] & ~s[0]) mask = {4'b0100,(lmask << 2) ^ (lmask >> 8)};
        if(s[2] & ~s[1]) mask = {4'b0101, (lmask << 4) ^ (lmask >> 6)};
        if(s[3] & ~s[2]) mask = {4'b0111, (lmask << 6) ^ (lmask >> 4)};
        if(s[4] & ~s[3]) mask = {4'b1100, (lmask << 8) ^ (lmask >> 2)};
case(s)
    5'b01001: mask = {4'b1101,2'b00,2'b00,4'b0000,1'b0,x[10]};
    5'b01011: mask ={4'b1101,2'b00,2'b01,2'b00,1'b0,x[10],2'b00};
    5'b01101: mask = {4'b1101,2'b00,2'b01,1'b0,x[10],2'b00,2'b01};
    5'b00101: mask = {4'b1101,2'b00,1'b0,x[10],4'b0000,2'b11};
    5'b01010: mask = {4'b1101,2'b00,2'b11,2'b00,1'b0,x[10],2'b00};
    5'b11010: mask = {4'b1111,2'b11,1'b0,x[10],2'b00,2'b11,2'b00};
    5'b10010: mask = {4'b1111,2'b11,4'b0000,1'b0,x[10],2'b00};
    5'b10100: mask = {4'b1111,2'b01,2'b00, 1'b0,x[10],4'b0000};
    5'b10110: mask ={4'b1111,2'b00,2'b00,2'b01,1'b0,x[10],2'b00};
    5'b10101: mask = {4'b1111,2'b00,2'b00,2'b11,2'b00, 1'b0,x[10]};
endcase
// xor mask and modified data
        y[13:0] = y_loc[13:0] ^ mask;
    end
endmodule
```

LISTING II

```
// DECODER ALGORITHM
module pam3dec_srs_v2 ( input logic [13:0] y, output logic [10:0] x1 );
always_comb begin
x1 = 10'b0;
unique casez(y[13:10])
    4'b000? : x1= y[10:0];
    4'b0011 :
        unique casez({y[7],y[5],y[3],y[1]})
            4'b???0 : x1 = {y[0],y[9:2],2'b10};
            4'b??01 : x1 = {y[2],y[9:4],4'b1010};
            4'b?011 : x1 = {y[4],y[9:6],6'b101010};
            4'b0111 : x1 = {y[6],y[9:8],8'b10101010};
            4'b1111 : x1 = {y[8],10'b1010101010};
        endcase
    4'b0100 :
        unique casez({y[9],y[7],y[5],y[3]})
            4'b???0 : x1 = {y[2],y[9:4],2'b10,y[1:0]};
            4'b??01 : x1 = {y[4],y[9:6],4'b1010,y[1:0]};
            4'b?011 : x1 = {y[6],y[9:8],6'b101010,y[1:0]};
            4'b0111 : x1 = {y[8],8'b10101010,y[1:0]};
        endcase
    4'b0101 :
        unique casez({y[1],y[9],y[7],y[5]})
            4'b???0 : x1 = {y[4],y[9:6],2'b10,y[3:0]};
            4'b??01 : x1 = {y[6],y[9:8],4'b1010,y[3:0]};
            4'b?011 : x1 = {y[8],6'b101010,y[3:0]};
            4'b0111 : x1 = {y[0],6'b101010,y[3:2],2'b10};
        endcase
    4'b0111 :
        unique casez({y[3],y[1],y[9],y[7]})
            4'b???0 : x1 = {y[6],y[9:8],2'b10,y[5:0]};
            4'b??01 : x1 = {y[8],4'b1010,y[5:0]};
            4'b?011 : x1 = {y[0],4'b1010,y[5:2],2'b10};
            4'b0111 : x1 ={y[2],4'b1010,y[5:4],4'b1010};
        endcase
    4'b1100 :
        unique casez({y[5],y[3],y[1],y[9]})
            4'b???0 : x1 = {y[8],2'b10,y[7:0]};
            4'b??01 : x1 = {y[0],2'b10,y[7:2],2'b10};
            4'b?011 : x1 = {y[2],2'b10,y[7:4],4'b1010};
            4'b0111 : x1 = {y[4],2'b10,y[7:6],6'b101010};
        endcase
    4'b1101 :
        unique casez({y[7:6],y[1:0]} )
            4'b000? : x1 = {y[0],y[9:8],2'b10,y[5:2],2'b10};
            4'b0100 : x1 = {y[2],y[9:8],2'b10,y[5:4],4'b1010};
            4'b0101 : x1 = {y[4],y[9:8],4'b1010,y[3:2],2'b10};
            4'b0?11 : x1 = {y[6],y[9:8],y[5:4],2'b10,y[3:2],2'b10};
            4'b11?? : x1 = {y[2],y[9:8],2'b10,y[5:4],2'b10,y[1:0]};
        endcase
    4'b1111 :
        unique casez({y[9:8],y[5:4],y[3:2]} )
            6'b01???? : x1 = {y[4],2'b10,y[7:6],2'b10,y[3:0]};
            6'b11??0? : x1 = {y[2],2'b10,y[7:4],2'b10,y[1:0]};
            6'b11??1? : x1 = {y[6],4'b1010,y[5:4],2'b10,y[1:0]};
            6'b0001?? : x1 = {y[2],2'b10,y[7:6],4'b1010,y[1:0]};
            6'b001??? : x1 = {y[0],2'b10,y[7:6],2'b10,y[3:2],2'b10};
        endcase
    endcase
end
endmodule
```

LISTING III

```
##Encoder Generator
    ##First Create all possible unique mappings of ternary symbols pairs to 3-bit binary
##Then, For every mapping iterate through all unique code pairs (ternary and binary) to
##find all valid 3b2S mappings where the hamming distance of ternary (2 symbol) pairs
##is greater than or equal to the hamming distance of corresponding binary (3bit) pairs.
#x is a binary representation for the ternary symbols (2 symbols) - 9 possibilities indexed
0 through 8
#y is the corresponding binary (3-bit) mapping (8 possibilities). The element of y that is 8
reflects the ERR position (9 possibilities including ERR)
$x[0] = 0 ;# (0,0) (0 + 0) : 3^0 x 0 + 3^0 x 0
$x[1] = 1 ;# (0,1) (0 + 1)
$x[2] = 2 ;# (0,2) (0 + 2)
$x[3] = 3 ;# (1,0) (3 + 0) : 3^1 x 1 + 3^0 x 0
$x[4] = 4 ;# (1,1) (3 + 1)
$x[5] = 5 ;# (1,2) (3 + 2)
$x[6] = 6 ;# (2,0) (6 + 0) : 3^1 x 2 + 3^0 x 0
$x[7] = 7 ;# (2,1) (6 + 1)
$x[8] = 8 ;# (2,2) (6 + 2) : 3^1 x 2 + 3^0 x 2
# step1, permutation, 8 is error position
# nested loops: goal is to find all unique possibilities for X to Y mappings
@ y="";
for($y[0]=0;$y[0]<9;$y[0]++){
for($y[1]=0;$y[1]<9;$y[1]++){
    next if($y[1]==$y[0]);
for($y[2]=0;$y[2]<9;$y[2]++){
    next if(($y[2]==$y[1]) || ($y[2]==$y[0]));
for($y[3]=0;$y[3]<9;$y[3]++){
    next if(($y[3]==$y[2]) || ($y[3]==$y[1]) || ($y[3]==$y[0])) ;
for($y[4]=0;$y[4]<9;$y[4]++){
    next if(($y[4]==$y[3]) || ($y[4]==$y[2]) || ($y[4]==$y[1]) || ($y[4]==$y[0])) ;
for($y[5]=0;$y[5]<9;$y[5]++){
    next if(($y[5]==$y[4]) || ($y[5]==$y[3]) || ($y[5]==$y[2]) || ($y[5]==$y[1]) ||
($y[5]==$y[0])) ;
for($y[6]=0;$y[6]<9;$y[6]++){
    next if(($y[6]==$y[5]) || ($y[6]==$y[4]) || ($y[6]==$y[3]) || ($y[6]==$y[2]) ||
($y[6]==$y[1]) || ($y[6]==$y[0])) ;
for($y[7]=0;$y[7]<9;$y[7]++){
    next if(($y[7]==$y[6]) || ($y[7]==$y[5]) || ($y[7]==$y[4]) || ($y[7]==$y[3]) ||
($y[7]==$y[2]) || ($y[7]==$y[1]) || ($y[7]==$y[0])) ;
for($y[8]=0;$y[8]<9;$y[8]++){
    next if(($y[8]==$y[7]) || ($y[8]==$y[6]) || ($y[8]==$y[5]) || ($y[8]==$y[4]) ||
($y[8]==$y[3]) || ($y[8]==$y[2]) || ($y[8]==$y[1]) || ($y[8]==$y[0])) ;
    #printf "selected seq (%d %d %d %d %d %d %d %d %d)\n",
$y[0],$y[1],$y[2],$y[3],$y[4],$y[5],$y[6],$y[7],$y[8];
    # error mapping - the element of y that is 8 corresponds to the error position, tracked in
a corresponding error array, "e"
    for($i=0;$i<9;$i++){
        if($y[$i]==8) {$e[$i]=1} else {$e[$i]=0};
    }
    # now, we have all mappings available
# check distance dx between xi and xj (ternary distance on 2 sets of 2-symbols)
# check distance dy between yi and yj (binary distance on 2 sets of 3-bits)
# if ei!=0 and ej!=0 and (dy>dx), then fail
    # pick i and j from 0..8 each
    # d(xi,xj) vs. d(yi,yj) (i!= j) (ei!= 0) (ej!= 0)
    # search
    $search_good=1;
    for($i=0;$i<9;$i++){
        next if($e[$i]==1); ## No need to compare error
        for($j=0;$j<9;$j++){
            next if(($i==$j) || ($e[$j]==1)); ## ignore hamming distance to the error position
because err position is detectable after decode (as it is an unused code)
        # now, different combination, and no error case
        $dx = fun_dx($x[$i],$x[$j]);
        $dy = fun_dy($y[$i],$y[$j]);
        if($dx < $dy) {$search_good=0;} ## Check for the hamming distance property
        }
    }
    if($search_good) {
        printf "good (%d %d %d %d %d %d %d %d %d)\n",
$y[0],$y[1],$y[2],$y[3],$y[4],$y[5],$y[6],$y[7],$y[8]; ## print the good 3-bit binary
sequence/mapping corresponding to the X array sequence (ternary symbol pair) defined at
the beginning of this code
    }
}
} #y0
} #y1
} #y2
} #y3
} #y4
```

LISTING III

```
} #y5
} #y6
} #y7
} #y8
sub fun_dx { ## Calculate the hamming distance for 2 sets of 2-symbol pairs
        $i0 = fun_x1st($_[0]); // 1
        $i1 = fun_x2nd($_[0]); // 0
        $j0 = fun_x1st($_[1]); // 2
        $j1 = fun_x2nd($_[1]); // 2
        $dist0 = abs($i0-$j0);
        $dist1 = abs($i1-$j1);
        #printf "debug dx %d %d %d\n", $_[0], $_[1], $dist0+$dist1;
        return ($dist0 + $dist1);
};
sub fun_dy { ## Calculate the hamming distance for 2 sets of 3-bits
        $k = $_[0] ^ $_[1];
        $bit0 = $k & 0x1;
        $bit1 = ($k>>1) & 0x1;
        $bit2 = ($k>>2) & 0x1;
        #printf "debug dy %d %d %d k(%d) \n", $_[0], $_[1], $bit0 + $bit1 + $bit2, $k;
        return ($bit0 + $bit1 + $bit2);
};
sub fun_x1st { ## Convert the binary representation of the first symbol back to the ternary
symbol (0,1,2)
        if($_[0]>=6) {$1sb = $_[0]-6}
        else {if($_[0]>=3) {$1sb = $_[0]-3} else {$1sb = $_[0]}}
        return $1sb;
};
sub fun_x2nd {## Convert the binary representation of the second symbol back to the
ternary symbol (0,1,2)
        if($_[0]>=6) {$msb = 2}
        else {if($_[0]>=3) {$msb = 1} else {$msb = 0}}
        return $msb;
};
```

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112 (f) for that claim element. Accordingly, claims in this application that do not otherwise include the "means for" [performing a function] construct should not be interpreted under 35 U.S.C § 112 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A transceiver configured to communicate a burst of data bits and meta-data bits for the data bits, the transceiver comprising:
   communication channels comprising a plurality of data channels and an error correction channel;
   an encoder configured to:
      apply 11b7s encoding to a first plurality of the data bits to generate first PAM-3 symbols on some or all of the communication channels; and
      apply 3b2s encoding to the meta-data bits to generate second PAM-3 symbols on some or all of the communication channels, wherein a Hamming distance between any pair of codes for the second PAM-3 symbols is greater than or equal to a Hamming distance of a binary code for the meta-data bits corresponding to the pair of codes.

2. The transceiver of claim 1, wherein the communication channels consist of eight data channels, two auxiliary data channels, and the error correction channel.

3. The transceiver of claim 1, wherein the encoder is configured to apply 3b2s encoding to a second plurality of the data bits to generate third PAM-3 symbols on the at the error correction channel.

4. The transceiver of claim 1, wherein the meta-data bits comprise cyclic redundancy check (CRC) bits and the binary code for the meta-data bits comprises a Gray Coding of the CRC bits.

5. The transceiver of claim 1, wherein the meta-data bits comprise a poison bit and a severity bit, and the encoder is configured to apply 3b2s encoding to generate one PAM-3 symbol for a combined state of the poison bit and the severity bit.

6. The transceiver of claim 5, wherein the PAM-3 symbol for the combined state of the poison bit and the severity bit is encoded on the error correction channel.

7. The transceiver of claim 1, wherein the meta-data bits comprise a poison bit and a severity bit, the encoder further configured to utilize particular reserved 11b7s codewords for the poison bit and the severity bit.

8. A transceiver configured to communicate a burst of data bits and meta-data bits for the data bits, the transceiver comprising:
   communication channels comprising a plurality of data channels and an error correction channel;
   a decoder configured to:
      apply 11b7s decoding to recover a first plurality of the data bits from first PAM-3 symbols on some or all of the communication channels; and
      apply 3b2s decoding to recover the meta-data bits from second PAM-3 symbols on some or all of the communication channels, wherein a Hamming distance between any pair of codes for the second PAM-3 symbols is greater than or equal to a Hamming distance of a binary code for the meta-data bits corresponding to the pair of codes.

9. The transceiver of claim 8, wherein the communication channels consists of eight data channels, two auxiliary data channels, and the error correction channel.

10. The transceiver of claim 8, wherein the decoder is configured to apply 3b2s decoding to recover a second plurality of the data bits from third PAM-3 symbols on the error correction channel.

11. The transceiver of claim 8, wherein the meta-data bits consist of a cyclic redundancy check (CRC) and one or both of a poison bit and a severity bit, and the decoder is further configured to apply 3b2s decoding to recover the CRC from the second PAM-3 symbols on the error correction channel.

12. The transceiver of claim 11, the decoder further configured to apply 3b2s decoding to recover a combined state of the poison bit and the severity bit from one PAM-3 symbol.

13. The transceiver of claim 12, wherein the PAM-3 symbol for the combined state of the poison bit and the severity bit is decoded from the error correction channel.

14. The transceiver of claim 11, the decoder further configured to recover the poison bit and the severity bit from PAM-3 symbols comprising particular reserved 11b7s codewords.

15. A method of communicating a burst of data bits over a serial data bus comprising a plurality of data channels and an error correction channel, the method comprising:
   applying 11b7s encoding to a first plurality of the data bits to generate first PAM-3 symbols on the serial data bus; and
   applying 3b2s encoding to meta-data bits for the data bits to generate second PAM-3 symbols on the serial data bus, wherein a Hamming distance between any pair of codes for the second PAM-3 symbols is greater than or equal to a Hamming distance of a binary code for the meta-data bits corresponding to the pair of codes.

16. The method of claim 15, wherein the serial data bus comprises eight data channels, two auxiliary data channels, and the error correction channel.

17. The method of claim 15, wherein the encoder applies 3b2s encoding to a second plurality of the data bits to generate third PAM-3 symbols on the error correction channel.

18. The method of claim 15, wherein the meta-data bits comprise a cyclic redundancy check (CRC) and the encoder applies 3b2s encoding to the CRC to generate the second PAM-3 symbols on the error correction channel.

19. The method of claim 15, wherein the meta-data bits comprise a poison bit and a severity bit, and the encoder further generates a 3b2s encoding of one PAM-3 symbol for a combined state of the poison bit and the severity bit.

20. The method of claim 19, wherein the PAM-3 symbol for the combined state of the poison bit and the severity bit is encoded on the error correction channel.

21. The method of claim 15, wherein the meta-data bits comprise a poison bit and a severity bit, the encoder further utilizing particular reserved 11b7s codewords to encode the poison bit and the severity bit.

22. A system comprising:
    a machine memory;
    a data processor;
    a memory bus coupling the machine memory to the data processor, the memory bus comprising eight data channels and an error correction channel; and
    an encoder configured to:
        apply 11b7s encoding to a first plurality of data bits to generate first PAM-3 symbols on some or all of the data channels and the error correction channel; and
        apply 3b2s encoding to meta-data bits for the data bits to generate second PAM-3 symbols on memory bus, wherein a Hamming distance between any pair of codes for the second PAM-3 symbols is greater than or equal to a Hamming distance of a binary code for the meta-data bits corresponding to the pair of codes.

23. The system of claim 22, wherein the encoder is configured to apply 3b2s encoding to a second plurality of the data bits to generate third PAM-3 symbols on the error correction channel.

24. The system of claim 22, wherein the meta-data bits comprise of a cyclic redundancy check (CRC) and the encoder is further configured to Gray Code the CRC.

25. The system of claim 22, wherein the meta-data bits comprise a poison bit and a severity bit, the encoder further configured to apply 3b2s encoding to generate one PAM-3 symbol for a combined state of the poison bit and the severity bit.

26. The system of claim 25, wherein the PAM-3 symbol for the combined state of the poison bit and the severity bit is encoded on the error correction channel.

27. The system of claim 22, wherein the meta-data bits comprise a poison bit and a severity bit, the encoder further configured to utilize particular reserved 11b7s codewords for the poison bit and the severity bit.

* * * * *